(12) United States Patent
Ito et al.

(10) Patent No.: US 12,724,526 B2
(45) Date of Patent: Sep. 1, 2026

(54) INFORMATION PROCESSING APPARATUS AND CONTROL METHOD FOR DISPLAYING INFORMATION ON A PLURALITY OF DISPLAYS

(71) Applicant: Lenovo (Singapore) Pte. Ltd., Singapore (SG)

(72) Inventors: Yoshinori Ito, Kanagawa (JP); Yuichi Sone, Kanagawa (JP); Poonam Dinesh Panchal, Morrisville, NC (US); Anastassios Markas, Morrisville, NC (US); Robert N. Reaves, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 227 days.

(21) Appl. No.: 18/785,883

(22) Filed: Jul. 26, 2024

(65) Prior Publication Data

US 2026/0029892 A1 Jan. 29, 2026

(51) Int. Cl.

*G06F 3/04817* (2022.01)
*G06F 3/0482* (2013.01)
*G06F 3/04845* (2022.01)

(52) U.S. Cl.

CPC ........ *G06F 3/04817* (2013.01); *G06F 3/0482* (2013.01); *G06F 3/04845* (2013.01); *G06F 2203/04803* (2013.01)

(58) Field of Classification Search

CPC ............... G06F 3/04817; G06F 3/0482; G06F 3/04845; G06F 2203/04803; G06F 3/0481; G06F 3/0486

See application file for complete search history.

(56) References Cited

U.S. PATENT DOCUMENTS 11,385,775 B2 * 7/2022 Singh ...................... G06F 9/451
2004/0036662 A1 * 2/2004 Sakumura ............. G06F 3/1446 345/1.3
2007/0283285 A1 * 12/2007 Buchmann ............. G06F 9/451 715/764

(Continued)

FOREIGN PATENT DOCUMENTS

JP 2013050873 A 3/2013
JP 2015233198 A 12/2015
JP 2018013850 A 1/2018

*Primary Examiner* — Asher D Kells

(74) *Attorney, Agent, or Firm* — Osha Bergman Watanabe & Burton LLP

(57) ABSTRACT

An information processing apparatus, that controls display on a plurality of displays, includes: a memory configured to store a program of an application; and a processor configured to control displaying a window of the application on at least one of the plurality of displays by executing the program of the application stored in the memory. The processor is configured to perform: when a drag operation is accepted for the window displayed on at least one of the plurality of displays, a first display process of displaying first icons corresponding to the plurality of displays on a display on which the drag operation is started, a first selection process of selecting a display corresponding to an icon selected by hovering an operation position over any of the first icons corresponding to the plurality of displays as a display for displaying the window being dragged.

8 Claims, 14 Drawing Sheets

(56) References Cited

U.S. PATENT DOCUMENTS

| | | | | |
|---|---|---|---|---|
| 2009/0083655 | A1* | 3/2009 | Beharie | G06F 9/451 715/781 |
| 2012/0096396 | A1* | 4/2012 | Ording | G06F 3/0481 715/799 |
| 2012/0254793 | A1* | 10/2012 | Briand | H04N 21/43615 715/781 |
| 2014/0096050 | A1* | 4/2014 | Boblett | G01C 21/3667 715/769 |
| 2014/0164990 | A1* | 6/2014 | Kim | G06F 3/0486 715/788 |
| 2015/0186016 | A1* | 7/2015 | Li | G06F 3/04847 715/765 |
| 2023/0393700 | A1* | 12/2023 | Louch | G06F 3/0481 |

* cited by examiner

| Embedded display icons | External display icons |
| --- | --- |
| (A1) · Dragging is started on display other than embedded display<br>· When not hovered<br>· Background color: dark gray | (B1) · Dragging is started on display other than external display<br>· When not hovered<br>· Background color: dark gray |
| (A2) · Dragging is started on display other than embedded display<br>· When hovered<br>· Background color: light gray | (B2) · Dragging is started on display other than external display<br>· When hovered<br>· Background color: light gray |
| (A3) · Dragging is started on embedded display<br>· When not hovered<br>· Background color: dark blue | (B3) · Dragging is started on external display<br>· When not hovered<br>· Background color: dark blue |
| (A4) · Dragging is started on embedded display<br>· When hovered<br>· Background color: light blue | (B4) · Dragging is started on external display<br>· When hovered<br>· Background color: light blue |

FIG. 8

INFORMATION PROCESSING APPARATUS AND CONTROL METHOD FOR DISPLAYING INFORMATION ON A PLURALITY OF DISPLAYS

TECHNICAL FIELD

The present invention relates to an information processing apparatus and a control method.

BACKGROUND

There is an information processing apparatus that can display information on a plurality of displays. For example, an information processing apparatus having a two-screen configuration has been disclosed, in which a display (display unit) is mounted on each of a first chassis and a second chassis that are rotatable via a connecting portion (hinge mechanism) (for example, Japanese Unexamined Patent Application Publication No. 2015-233198). In addition, there is also an information processing apparatus in which a flexible display (display unit) such as an organic EL display is provided across the first chassis and the second chassis to be bendable according to the rotation of the first chassis and the second chassis (for example, see Japanese Unexamined Patent Application Publication No. 2018-13850). In this case, it is possible to split the display area into a display area on the first chassis side and a display area on the second chassis side and use the display area as a pseudo two-screen display. In addition, by connecting an external display, it is also possible to display on an embedded display and the external display
(see, for example, Japanese Unexamined Patent Application Publication No. 2013-050873).

In an information processing apparatus that can display information on a plurality of displays, a user can display a window of an application on any display (screen area) among the plurality of displays such that the user can easily perform work. For example, the information processing apparatus may be equipped with a function (so-called snap display) of selecting one display from among the plurality of displays by the user and selecting a display area from among two or more display areas split into left and right, upper and lower, or the like in a screen area of the selected display to display a window.

However, a user may select a display and want to display a window by selecting a part of the display area within the screen area of the selected display or the user may simply want to change the display on which the window is to be displayed. As described above, if there are a plurality of displays available, there are various options for the user when selecting a display for displaying a window, and for example, even if the user simply wants to change a display for displaying a window, there are cases where he or she has to select a display area within the screen area of the display for displaying a window, which can make the operation difficult.

SUMMARY

One or more embodiments of the present invention provide an information processing apparatus and a control method that improve operability when selecting a display destination when using a plurality of displays.

One or more embodiments of the present invention provide an information processing apparatus that controls display on a plurality of displays, the apparatus including: a memory configured to store a program of an application, and a processor configured to control displaying a window of the application on at least one of the plurality of displays by executing the program of the application stored in the memory, in which the processor is configured to perform: when a drag operation is accepted for the window displayed on at least one of the plurality of displays, a first display process of displaying first icons corresponding to the plurality of displays on a display on which the drag operation is started, a first selection process of selecting a display corresponding to an icon selected by hovering an operation position of the drag operation over any of the first icons corresponding to the plurality of displays as a display for displaying the window being dragged, a second display process of displaying a second icon from which a display area is selectable, in which the window is to be displayed within a screen area of the display selected by the first selection process, a second selection process of selecting a display area selected by the drag operation on the second icon as a display area for displaying the window being dragged, when the drag operation is completed on the window with the operation position of the drag operation hovered over any of the first icons and no display area selected by the second selection process, a third display process of displaying the window at a predetermined position in the screen area of the display selected by the first selection process, and when the drag operation is completed on the window with any display area selected by the second selection process, a fourth display process of displaying the window in the display area selected by the second selection process within the screen area of the display selected by the first selection process.

In the information processing apparatus according to one or more embodiments, display area options that can be selected by the drag operation on the second icon may include an option in which a display area is selectable, which is obtained by splitting the screen area of the display selected by the first selection process into a plurality of areas, and an option in which the entire screen area is selectable as a display area.

In the information processing apparatus according to one or more embodiments, in the third display process, the processor may display the window at a center position of the screen area of the display selected by the first selection process.

In the information processing apparatus according to one or more embodiments, in the third display process, the processor may display the window at a predetermined size smaller than a maximum size at the predetermined position in the screen area of the display selected by the first selection process.

In the information processing apparatus according to one or more embodiments, in the third display process, the processor may maximize and display the window in the screen area of the display selected by the first selection process.

In the information processing apparatus according to one or more embodiments, in the third display process, the processor may display the window at the predetermined position in the screen area of the display selected by the first selection process, without changing a size of the window when the drag operation is performed.

In the information processing apparatus according to one or more embodiments, when the size of the window when the drag operation is performed is larger than a maximum size, in the third display process, the processor may change the size of the window to be displayed in the screen area of the display selected by the first selection process and display the window at the maximum size or a predetermined size smaller than the maximum size.

In addition, a control method in an information processing apparatus according to one or more embodiments of the present invention including a memory configured to store a program of an application, and a processor configured to control displaying a window of the application on at least one of a plurality of displays by executing the program of the application stored in the memory, the method including: via the processor, when a drag operation is accepted for the window displayed on at least one of the plurality of displays, a first display step of displaying first icons corresponding to the plurality of displays on a display on which the drag operation is started, a first selection step of selecting a display corresponding to an icon selected by hovering an operation position of the drag operation over any of the first icons corresponding to the plurality of displays as a display for displaying the window being dragged, a second display step of displaying a second icon from which a display area is selectable, in which the window is to be displayed within a screen area of the display selected in the first selection step, a second selection step of selecting a display area selected by the drag operation on the second icon as a display area for displaying the window being dragged, when the drag operation is completed on the window with the operation position of the drag operation hovered over any of the first icons and no display area selected by the second selection step, a third display step of displaying the window at a predetermined position in the screen area of the display selected by the first selection step, and when the drag operation is completed on the window with any display area selected by the second selection step, a fourth display step of displaying the window in the display area selected by the second selection step within the screen area of the display selected by the first selection step.

According to one or more embodiments of the present invention, it is possible to improve the operability of selecting a display destination when using a plurality of displays.

BRIEF DESCRIPTION OF THE DRAWINGS

FIG. 8 is a view illustrating a list of display modes of the display selection icons according to one or more embodiments.

DETAILED DESCRIPTION

Hereinafter, embodiments of the present invention will be described with reference to the accompanying drawings.

Appearance of Information Processing Apparatus

Figure 1:
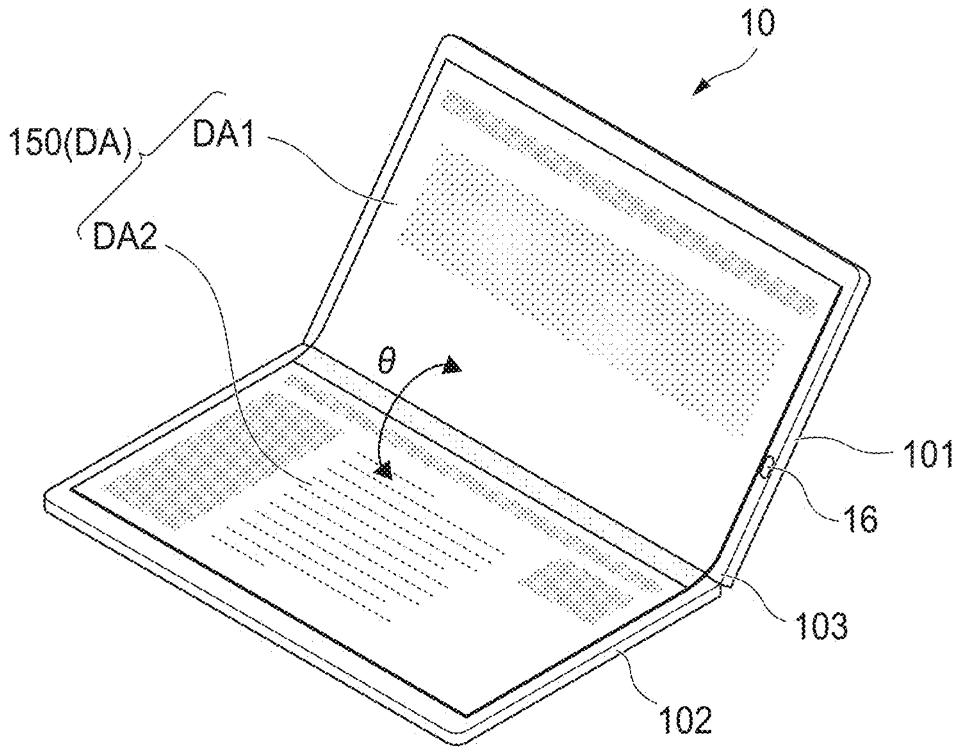
FIG. 1 is a perspective view illustrating the appearance of an information processing apparatus according to one or more embodiments.

FIG. 1 is a perspective view illustrating the appearance of an information processing apparatus 10 according to one or more embodiments. The information processing apparatus 10 according to one or more embodiments is a clamshell (laptop) personal computer (PC). The information processing apparatus 10 is provided with a first chassis 101, a second chassis 102, and a hinge mechanism 103. The first chassis 101 and the second chassis 102 are chassis having a substantially quadrangular plate shape (for example, flat plate shape). One of side surfaces of the first chassis 101 and one of side surfaces of the second chassis 102 are coupled (connected) via the hinge mechanism 103, and the first chassis 101 and the second chassis 102 are relatively rotatable around a rotation axis formed by the hinge mechanism 103. A state in which an opening angle θ around the rotation axis of the first chassis 101 and the second chassis 102 is about 0° is a state in which the first chassis 101 and the second chassis 102 overlap with each other and are closed. A state in which the first chassis 101 and the second chassis 102 are closed will be referred to as a "closed state". In the closed state, surfaces of the first chassis 101 and the second chassis 102 facing each other will be referred to as "inner surfaces", and surfaces opposite to the inner surfaces will be referred to as "outer surfaces". The opening angle θ can also be referred to as an angle formed by the inner surface of the first chassis 101 and the inner surface of the second chassis 102. A state in which the first chassis 101 and the second chassis 102 are opened with respect to the closed state will be referred to as an "open state". The open state is a state in which the first chassis 101 and the second chassis 102 are relatively rotated until the opening angle θ exceeds a preset threshold value (for example, 10°).

The information processing apparatus 10 is provided with a camera 16 and a display 150. The camera 16 is provided on the inner surface of the first chassis 101. The display 150 is provided over the inner surface of the first chassis 101 and the inner surface of the second chassis 102. The camera 16 is provided in, for example, an outer portion of a screen area of the display 150 on the inner surface of the first chassis 101, and can image a user or the like who exists on the side facing the display 150. The display 150 is a flexible display that can be bent according to the opening angle θ due to the relative rotation of the first chassis 101 and the second chassis 102 (see FIGS. 2 and 3). An organic EL display or the like is used as the flexible display. The information processing apparatus 10 can control display of an entire screen area of the display 150 as one display area DA in a one-screen configuration, and can also control display by splitting the entire screen area of the display 150 into two display areas, a first display area DA1 and a second display area DA2, in a two-screen configuration. Here, the first display area DA1 and the second display area DA2 are the display areas that do not overlap with each other. Here, among the screen areas of the display 150, a display area corresponding to the inner surface side of the first chassis 101 is defined as the first display area DA1, and a display area corresponding to the inner surface side of the second chassis 102 is defined as the second display area DA2. In the following description, a display mode in which display is controlled with the one-screen configuration will be referred to as a "one-screen mode", and a display mode in which display is controlled with the two-screen configuration will be referred to as a "two-screen mode".

A touch sensor is provided on the screen area of the display 150. The information processing apparatus 10 can detect a touch operation on the screen area of the display 150. By bringing the information processing apparatus 10 into an open state, the user can visually recognize display of the display 150 provided on the inner surface of each of the first chassis 101 and the second chassis 102, or can perform the touch operation on the display 150, and thus can use the information processing apparatus 10.

Hereinafter, a usage form and the screen mode of the information processing apparatus 10 will be described in detail. First, the usage forms of the information processing apparatus 10 are classified into a bent form in which the first chassis 101 and the second chassis 102 are bent according to the opening angle θ between the first chassis 101 and the second chassis 102, and a flat form in which the first chassis 101 and the second chassis 102 are not bent. In the following description, the bent form in which the first chassis 101 and the second chassis 102 are bent will be simply referred to as a "bent form", and the flat form in which the first chassis 101 and the second chassis 102 are not bent will be simply referred to as a "flat form". In the bent form, the display 150 provided over the first chassis 101 and the second chassis 102 is also in the bent form. In the flat form, the display 150 is also in the flat state.

Figure 2:
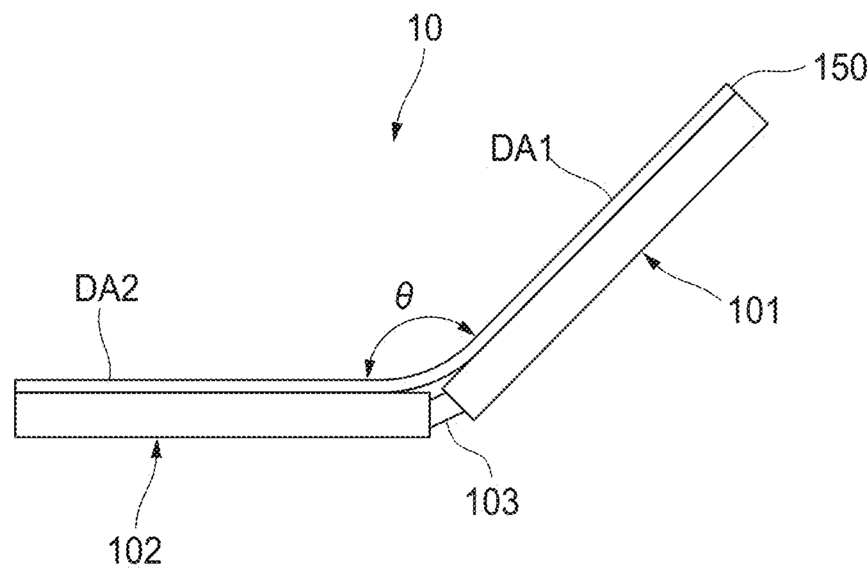
FIG. 2 is a side view illustrating an example of the information processing apparatus in a bent state according to one or more embodiments.

FIG. 2 is a side view illustrating an example of the information processing apparatus 10 in the bent form. The display 150 is arranged over (across) the first chassis 101 and the second chassis 102. The screen area (display area DA illustrated in FIG. 1) of the display 150 can be folded (bent) with a portion corresponding to the hinge mechanism 103 as a crease, and the display area on the first chassis 101 side is illustrated as the first display area DA1 and the display area on the second chassis 102 side is illustrated as the second display area DA2 with the crease as a boundary. The display 150 is bent according to the rotation (opening angle θ) of the first chassis 101 and the second chassis 102. It is determined whether or not the information processing apparatus 10 is in the bent form according to the opening angle θ. As an example, in a case in which $10° < \theta < 170°$, it is determined that the information processing apparatus 10 is in the bent form. This state corresponds to the usage form such as a so-called clamshell mode or book mode.

Figure 3:
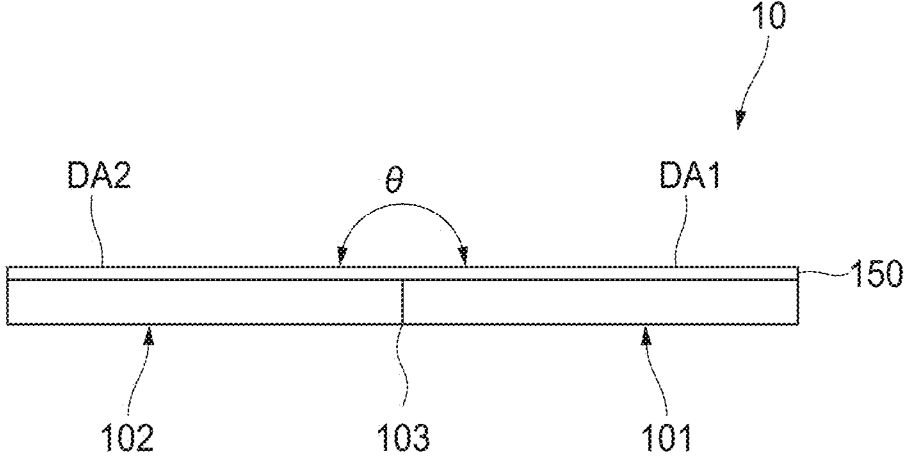
FIG. 3 is a side view illustrating an example of the information processing apparatus in a flat state according to one or more embodiments.

FIG. 3 is a side view illustrating an example of the information processing apparatus 10 in a flat form. It is typically determined that the information processing apparatus 10 is in the flat form in a case in which the opening angle θ is 180°, but as an example, it may be determined that the information processing apparatus 10 is in the flat form in a case in which $170° \leq \theta \leq 180°$. For example, in a case in which the opening angle θ between the first chassis 101 and the second chassis 102 is 180°, the display 150 is also in the flat state. This state corresponds to the usage form called a so-called tablet mode.

Description of Display Mode

Figure 4:
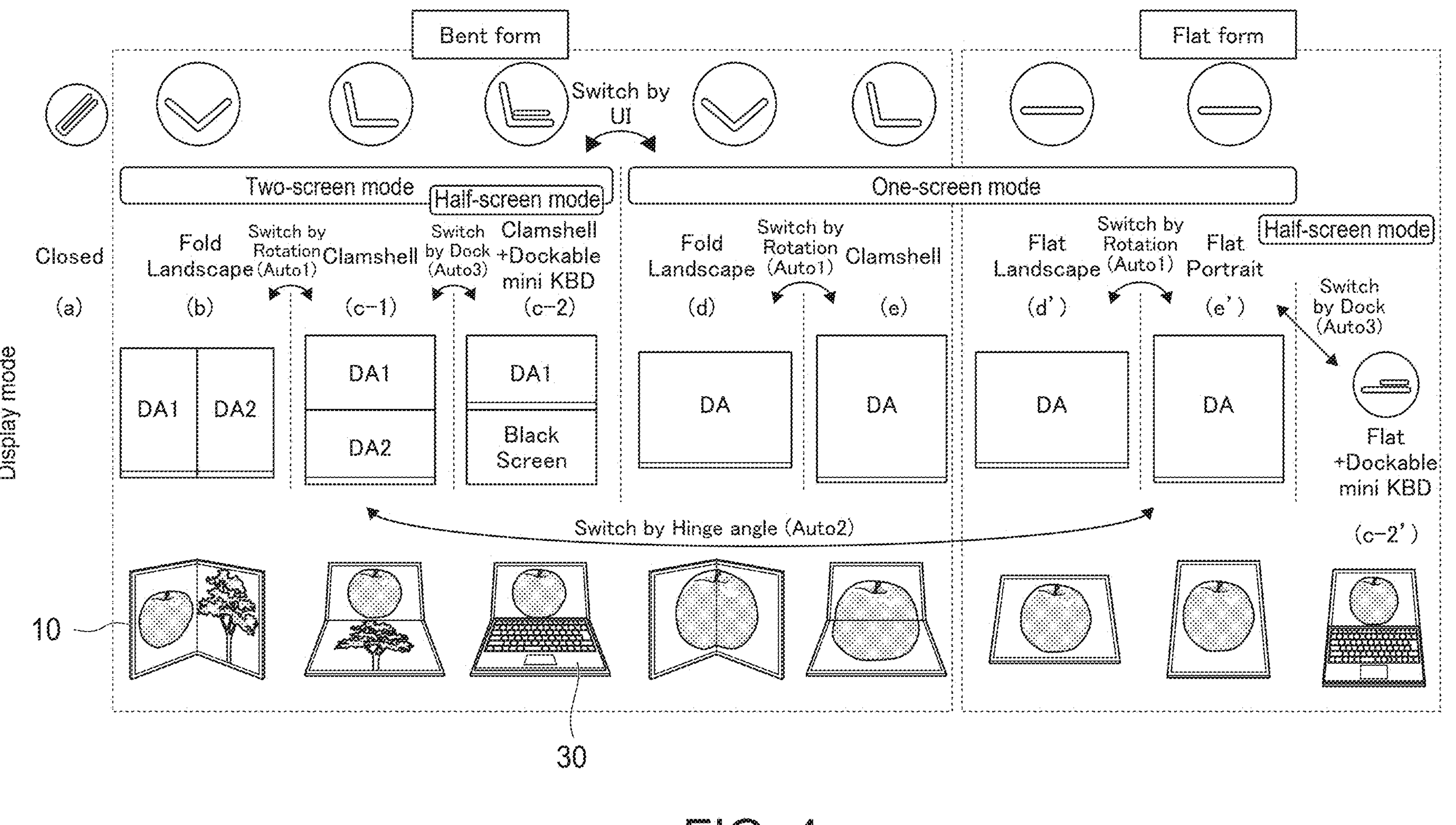
FIG. 4 is a view illustrating specific examples of various display modes of the information processing apparatus according to one or more embodiments.

Hereinafter, the display modes according to various usage forms of the information processing apparatus 10 will be described in detail with reference to FIG. 4. FIG. 4 is a view illustrating specific examples of various display modes of the information processing apparatus 10 according to one or more embodiments. The information processing apparatus 10 has different display modes according to the usage forms classified according to the opening angle θ between the first chassis 101 and the second chassis 102, a posture (orientation) of the information processing apparatus 10, whether the one-screen mode is used or the two-screen mode is used, and the like. The one-screen will also be called a single screen, and the two-screen will also be called a split screen, a dual screen, or the like.

A display mode (a) when the first chassis 101 and the second chassis 102 are in the closed state (Closed) as the usage form. In this closed state, the information processing apparatus 10 is, for example, in a standby state such as a sleep or suspended state (hibernation), and the display 150 is in a display-off state. The standby state such as the sleep or suspended state (hibernation) corresponds to S3 or S4 of a power supply state of a system defined by, for example, an advanced configuration and power interface (ACPI).

A display mode (b) is a display mode when the usage form is the bent form, and the two-screen mode is used in which display is controlled such that the screen area of the display 150 is split into the two display areas, the first display area DA1 and the second display area DA2. The orientation of the information processing apparatus 10 is a portrait orientation such that the first display area DA1 and the second display area DA2 are in a portrait orientation and are horizontally arranged from side to side. The portrait orientation of the display area is an orientation in which a long side of four sides of a rectangular display area is in a vertical direction and a short side is in a horizontal direction. In a case in which the display area is in the portrait orientation, a display orientation is also the portrait orientation, and display is performed in an orientation in which a direction along the long side corresponds to an up-down direction and a direction along the short side corresponds to a left-right direction. This usage form is a usage form in which left and right pages when a book is opened correspond to left and right screens, and corresponds to the so-called book mode. This usage form will also be referred to as a "Fold Landscape" because the usage form is the bent form, the first display area DA1 and the second display area DA2 are arranged side by side, and the display area obtained by combining the first display area DA1 and the second display area DA2 is horizontally long.

In this display mode (b), for example, in a normal operation state, the information processing apparatus 10 is in the two-screen display mode in which the first display area DA1 on the left side is used as a primary screen and the second display area DA2 on the right side is used as a secondary screen. In the display mode (b), a correspondence relationship between the first display area DA1 and the second display area DA2, and the primary screen and the secondary screen may be reversed.

As in the display mode (b), a display mode (c-1) is a display mode when the usage form is the bent form, and the two-screen mode is used in which display is controlled such that the screen area of the display 150 is split into two display areas, the first display area DA1 and the second display area DA2, but an orientation of the information processing apparatus 10 is different. The orientation of the information processing apparatus 10 is a portrait orientation such that the first display area DA1 and the second display area DA2 are arranged vertically, up and down in a landscape orientation. The landscape orientation of the display area is an orientation in which a long side of four sides of a rectangular display area is in a horizontal direction and a short side is in a vertical direction. In a case in which the display area is in the landscape orientation, a display orientation is also the landscape orientation, and display is performed in an orientation in which a direction along the short side corresponds to an up-down direction and a direction along the long side corresponds to a left-right direction. This usage form is one of general usage forms of a clamshell PC.

In this display mode (c-1), for example, in a normal operation state, the information processing apparatus 10 is in the two-screen display mode in which the first display area DA is used as a primary screen and the second display area DA2 is used as a secondary screen. In the display mode (c-1), a correspondence relationship between the first display area DA1 and the second display area DA2, and the primary screen and the secondary screen may be reversed.

For example, the information processing apparatus 10 detects a change in the posture (orientation) of the information processing apparatus 10, and thus automatically performs switching from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when the rightward rotation from a state of the display mode (b) by a predetermined angle (for example, 45 degrees) or more is detected, the information processing apparatus 10 performs the switching to the display mode (c-1). Since the display mode (b) is a state in which the display 150 is rotated 90 degrees leftward with respect to the display mode (c-1) as illustrated, when the leftward rotation from a state of the display mode (c-1) by a predetermined angle (for example, 45 degrees) or more is detected, the information processing apparatus 10 performs the switching to the display mode (b).

As in the display mode (c-1), in a display mode (c-2), the bent form is used and the orientation of the information processing apparatus 10 is the same, but there is a difference in that an external keyboard 30 (Dockable mini Keyboard (KBD)) that can be connected to the information processing apparatus 10 is connected. This usage form is a state in which the physical keyboard 30 is connected in a general usage form of a clamshell PC. For example, the keyboard 30 has almost the same size as the second display area DA2, and can be placed on the second display area DA2. As an example, the keyboard 30 is provided with a magnet in an inner portion (end portion) of a bottom surface, and when the keyboard 30 is placed on the second display area DA2, the keyboard 30 is attracted and fixed to a metal portion of an end portion on the inner surface of the second chassis 102. As a result, the usage form is the same as the usage form of a conventional clamshell PC that is originally provided with the physical keyboard. In addition, the information processing apparatus 10 and the keyboard 30 are connected by, for example, Bluetooth (registered trademark). In this display mode (c-2), the information processing apparatus 10 controls the second display area DA2 to be displayed black or turned off because the second display area DA2 cannot be visually recognized due to the keyboard. In other words, this display mode (c-2) is a display mode (hereinafter, referred to as a "half-screen mode") in which only half screen is valid for display, and is the one-screen mode using only the first display area DA1.

For example, when the information processing apparatus 10 detects the connection with the external keyboard in a state of the display mode (c-1), the information processing apparatus 10 automatically performs the switching from the display mode (c-1) to the display mode (c-2) (Switch by Dock).

As in the display mode (b), in a display mode (d), the bent form is used and the orientation of the information processing apparatus 10 is the same, but there is a difference in that the display mode (d) is the one-screen mode in which display is controlled such that the entire screen area of the display 150 is used as one display area DA. This usage form is different from the display mode (b) in that the one-screen mode is used, but will also be referred to as the "Fold Landscape" because the bent form is used and the display area DA is horizontally long. The display area DA is in the landscape orientation, and the display orientation is also the landscape orientation.

Here, switching between the one-screen mode and the two-screen mode in the bent form can be performed, for example, by the user's operation. For example, the information processing apparatus 10 displays an operating element as a user interface (UI) that allows switching between the one-screen mode and the two-screen mode at any place on the screen, and performs the switching from the display mode (b) to the display mode (d) based on an operation on the operating element (switch by UI).

As in the display mode (c-1), in a display mode (e), the bent form is used and the orientation of the information processing apparatus 10 is the same, but there is a difference in that the display mode (e) is the one-screen mode in which display is controlled such that the entire screen area of the display 150 is used as one display area DA. This usage form is different from the display mode (c-1) in that the one-screen mode is used, but corresponds to the usage form of the clamshell PC in terms of the bent form and the orientation of the information processing apparatus 10. The display area DA is in the portrait orientation, and the display orientation is also the portrait orientation.

For example, the information processing apparatus 10 detects a change in the posture (orientation) of the information processing apparatus 10, and thus automatically performs switching from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when the rightward rotation from a state of the display mode (d) by a predetermined angle (for example, 45 degrees) or more is detected, the information processing apparatus 10 performs the switching to the display mode (e). Since the display mode (d) is a state in which the display 150 is rotated 90 degrees leftward with respect to the display mode (e) as illustrated, when the leftward rotation from a state of the display mode (e) by a predetermined angle (for example, 45 degrees) or more is detected, the information processing apparatus 10 performs the switching to the display mode (d).

As in the display mode (d), in a display mode (d'), the one-screen mode is used and the orientation of the information processing apparatus 10 is an orientation in which the display area DA is horizontally long, but there is a difference in that the flat form is used. The flat form is a state in which the opening angle θ between the first chassis 101 and the second chassis 102 is about 180°. This usage form corresponds to the so-called tablet mode described with reference to FIG. 3, and will also be referred to as the "Flat Landscape" because the flat form is used and the display area DA is horizontally long. This display mode (d') is different from the display mode (d) only in terms of the opening angle θ between the first chassis 101 and the second chassis 102. As in the display mode (d), the display area DA is in the landscape orientation, and the display orientation is also the landscape orientation.

As in the display mode (e), in a display mode (e'), the one-screen mode is used and the orientation of the information processing apparatus 10 is an orientation in which the display area DA is vertically long, but there is a difference in that the flat form is used. This usage form will also be referred to as a "Flat Portrait" because the flat form is used and the display area DA is vertically long. This display mode (e') is different from the display mode (e) only in terms of the opening angle θ between the first chassis 101 and the second chassis 102. As in the display mode (e), the display area DA is in the portrait orientation, and the display orientation is also the portrait orientation.

For example, the information processing apparatus 10 detects a change in the posture (orientation) of the information processing apparatus 10, and thus automatically performs switching from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when the rightward rotation from a state of the display mode (d') by a predetermined angle (for example, 45 degrees) or more is detected, the information processing apparatus 10 performs the switching to the display mode (e'). Since the display mode (d') is a state in which the display 150 is rotated 90 degrees leftward with respect to the display mode (e') as illustrated, when the leftward rotation from a state of the display mode (e') by a predetermined angle (for example, 45 degrees) or more is detected, the information processing apparatus 10 performs the switching to the display mode (d').

Here, switching between the one-screen mode and the two-screen mode in the flat form can be performed, for example, by the user's operation. For example, as described above, in the display mode (d') and the display mode (e'), the information processing apparatus 10 displays the operating element as a UI that allows switching between the one-screen mode and the two-screen mode at any place on the screen, and by the user operating this operating element, it is also possible to switch to the two-screen mode while remaining in the flat form. For example, when the switching from a state of the display mode (d') to the two-screen mode is performed, the display state is the same as the display state of the display mode (b) in the flat form. When the switching from a state of the display mode (e') to the two-screen mode is performed, the display state is the same as the display state of the display mode (c-1) in the flat form.

When the information processing apparatus 10 detects the connection with the keyboard 30 in a state of the display mode (e'), the information processing apparatus 10 automatically performs the switching from the display mode (e') to the display mode (c-2') (Switch by Dock). The display mode (c-2') is the flat form, and is different from the display mode (c-2) only in terms of the opening angle θ between the first chassis 101 and the second chassis 102. In this display mode (c-2'), the information processing apparatus 10 controls the second display area DA2 to be displayed black or turned off because the second display area DA2 cannot be visually recognized due to the keyboard. In other words, as in the display mode (c-2), this display mode (c-2') is the half-screen mode in which only one half screen is valid for display.

Further, the information processing apparatus 10 can also automatically switch from the one-screen mode to the two-screen mode by detecting a change from a flat form to a bent form (switch by hinge angle). For example, in a case in which the change to the bent form in a state of the display mode (d') is detected based on the opening angle θ between the first chassis 101 and the second chassis 102, the information processing apparatus 10 automatically performs the switching from the display mode (d') to the display mode (b). In a case in which the change to the bent form in a state of the display mode (e') is detected based on the opening angle θ between the first chassis 101 and the second chassis 102, the information processing apparatus 10 automatically performs the switching from the display mode (e') to the display mode (c-1).

Further, the information processing apparatus 10 has a function of arranging a window of an application in a desired display area within the screen area (so-called snap display), in addition to switching between display modes such as the one-screen mode and the two-screen mode described above. For example, the information processing apparatus 10 displays an operating element as a user interface (UI) from which a display area within the screen area of the display 150 can be selected, in which a window is to be arranged (laid out), and displays the window in a display area selected by the user based on the user's operation on the operating element. The UI from which the display area in which this window is to be arranged can be selected will be referred to as a "layout selection icon" below.

The layout of the display area that can be selected by operating this layout selection icons is the layout for the entire screen area (display area DA) of the display 150 in both the one-screen mode and the two-screen mode. In addition, in the case of half-screen mode, the layout is for half of the screen area of the display 150.

Example of Layout Selection Icons

Next, a specific example of the layout selection icons will be described.

Figure 5A:
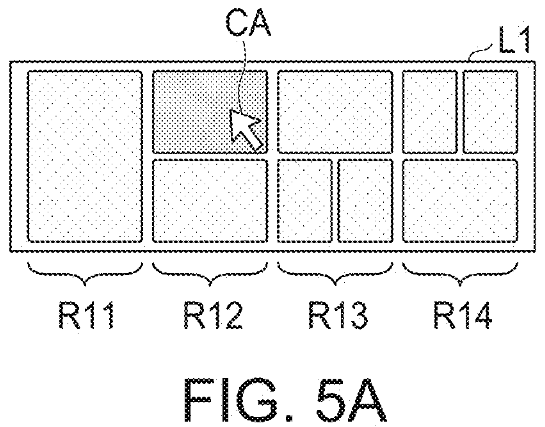
FIGS. 5A-5B are views illustrating a display example of layout selection icons according to one or more embodiments.
Figure 5B:
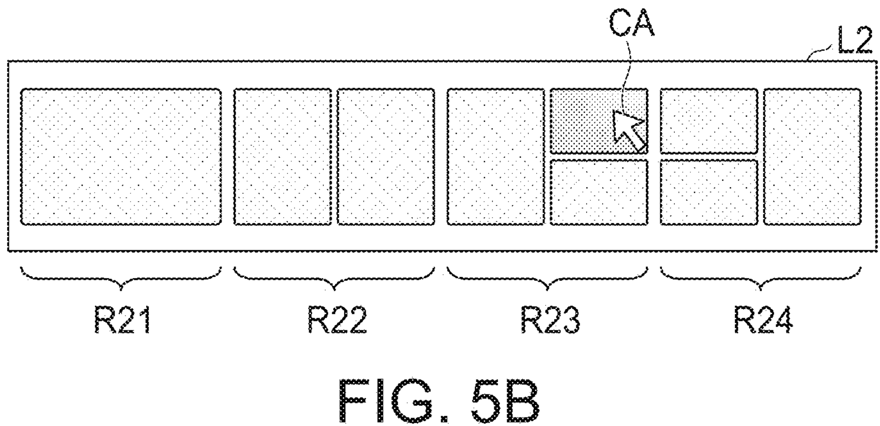

FIGS. 5A-5B are views illustrating a display example of layout selection icons according to one or more embodiments. FIG. 5A illustrates an example of a layout selection icon L1 displayed when the usage form is "Portrait (or Clamshell)" (display mode (c-1), display mode (e), display mode (e'), and the like).

In the layout selection icon L1, the portion indicated by a reference numeral R11 is a layout in which the entire screen area of the display 150 is one display area, and the entire screen area can be selected as the display area in which a window is to be arranged. The portion indicated by a reference numeral R12 is a layout in which the screen area is split into two, upper and lower, and the upper display area or the lower display area within the screen area can be selected as the display area in which a window is to be arranged. In addition, the portion indicated by a reference numeral R13 and the portion indicated by a reference numeral R14 are layouts in which the screen area is split into three. The portion indicated by the reference numeral R13 is a layout in which the lower display area, which is obtained by splitting the screen area into two, upper and lower, is further split into two, left and right. The portion indicated by the reference numeral R14 is a layout in which the upper display area, which is obtained by splitting the screen area into two, upper and lower, is further split into two, left and right. In the portion indicated by the reference numeral R13 and the portion indicated by the reference numeral R14, any one of three display areas can be selected as a display area in which a window is to be arranged.

For example, when the usage form is "Portrait (or Clamshell)", the layout selection icon L1 is displayed when the user drags a window. As illustrated in the figure, when a cursor CA, which is being dragged, is hovered over the upper area of the layout obtained by splitting the screen area into two, indicated by the reference numeral R12, the display area corresponding to the upper area is selected. The display mode (color, brightness, or the like) of the selected area within the layout selection icon L1 is changed. When the drag operation is completed, a window is displayed in the selected upper display area.

FIG. 5B illustrates an example of the layout selection icon L2 displayed when the usage form is "Landscape" (display mode (b), display mode (d), display mode (d'), and the like).

In the layout selection icon L2, the portion indicated by the reference numeral R21 is a layout in which the entire screen area of the display 150 is one display area, and the entire screen area can be selected as the display area in which a window is to be arranged. The portion indicated by a reference numeral R22 is a layout in which the screen area is split into two, left and right, and the left display area or the right display area within the screen area can be selected as the display area in which a window is to be arranged. In addition, the portion indicated by a reference numeral R23 and the portion indicated by a reference numeral R24 are layouts in which the screen area is split into three. The portion indicated by the reference numeral R23 is a layout in which the right display area, which is obtained by splitting the screen area into two, left and right, is further split into two, upper and lower. The portion indicated by the reference numeral R24 is a layout in which the left display area, which is obtained by splitting the screen area into two, left and right, is further split into two, upper and lower. In the portion indicated by the reference numeral R23 and the portion indicated by the reference numeral R24, any one of three display areas can be selected as a display area in which a window is to be arranged.

For example, when the usage form is "Landscape", the layout selection icon L2 is displayed by the user dragging a window. As illustrated in the figure, when the cursor CA that is being dragged is hovered over the upper area on the right side of the layout in which the screen area indicated by the reference numeral R23 is split into three, the display area corresponding to the upper area on the right side is selected. The display mode (color, brightness, or the like) of the selected area within the layout selection icon L2 is changed. When the drag operation is completed, a window is displayed in the selected upper display area on the right side.

Configuration of Connection With External Display

Figure 6:
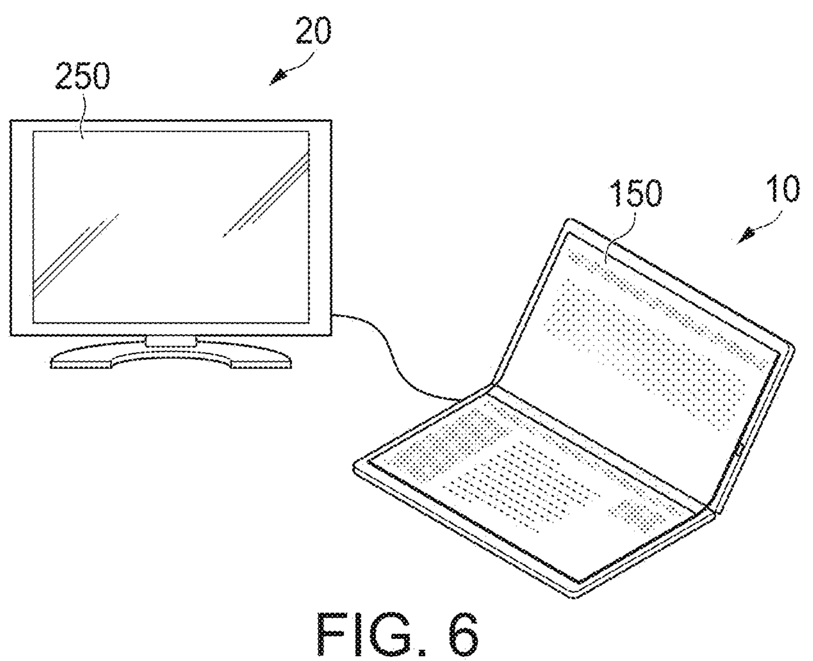
FIG. 6 is a view illustrating an example of a configuration in which the information processing apparatus according to one or more embodiments is connected to an external display.

In addition, the information processing apparatus 10 can also be used by being connected to an external display. FIG. 6 is a view illustrating an example of a configuration in which the information processing apparatus 10 according to one or more embodiments is connected to an external display. The information processing apparatus 10 is connected to an external display device 20 (display device). Any connection method using HDMI (registered trademark), USB Type-C, display port, or the like can be applied as a connection method. The information processing apparatus 10 may be wirelessly connected to the external display device 20. The external display device 20 is configured to include a display 250 as an external display. In contrast to an external display, the display 150 of the information processing apparatus 10 is an embedded display.

When connecting to the external display device 20 and controlling display in a plurality of screen areas (a plurality of screen areas that do not overlap with each other) between the screen area of the embedded display and the screen area of the external display, the information processing apparatus 10 can display a window on both the screen area of the embedded display and the screen area of the external display by using the layout selection icons described with reference to FIGS. 5A-5B.

For example, the information processing apparatus 10 can display a window displayed in the screen area of the embedded display in any of the display areas in each layout within the screen area of the embedded display, or can display the window in any of the display areas in each layout of the external display. Similarly, the information processing apparatus 10 can display a window displayed on the screen area of the external display in any of the display areas in each layout of the external display, or in any of the display areas in each layout within the screen area of the embedded display.

When connected to the external display device 20, the information processing apparatus 10 displays a UI as an operating element for selecting which of the embedded display and the external display is to be the screen area for displaying a window before displaying the layout selection icons illustrated in FIGS. 5A-5B. This UI will be referred to as a "display selection icon" below.

Example of Display Selection Icons

Figure 7:
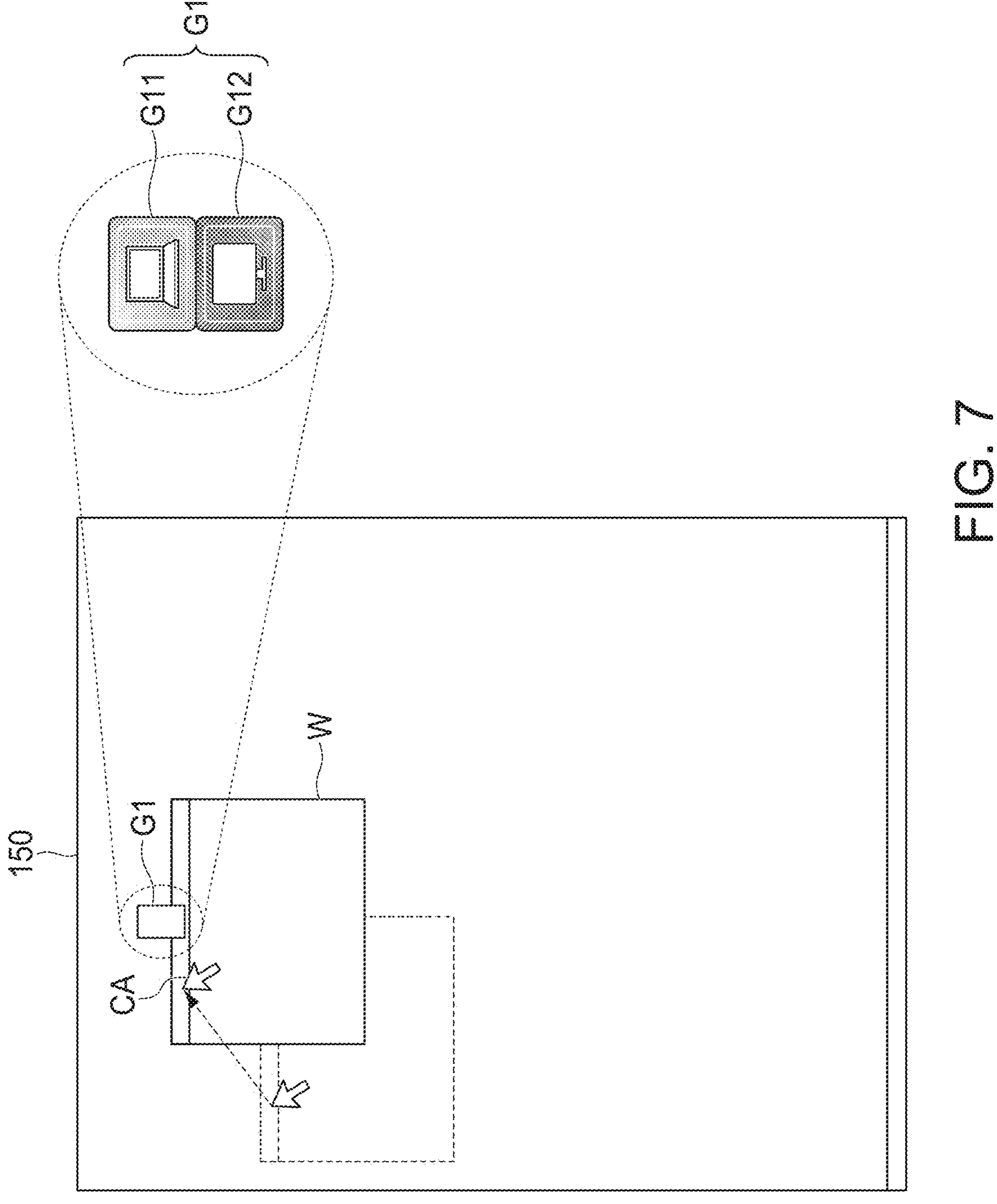
FIG. 7 is a view illustrating a display example of display selection icons according to one or more embodiments.

FIG. 7 is a view illustrating a display example of display selection icons according to one or more embodiments. When a drag operation is started on a window W displayed on the embedded display (display 150) or external display (display 250), display selection icons G1 are displayed near the position of the cursor CA to be dragged. This figure illustrates an example when a drag operation is started on the window W displayed on the embedded display (display 150). The display position of the display selection icons G1 remains unchanged even if the cursor CA is moved by a drag operation.

The display selection icons G1 include an embedded display icon G11 corresponding to the screen area of the embedded display, and an external display icon G12 corresponding to the screen area of the external display. The embedded display icon G11 and the external display icon G12 are displayed with different designs (figures, pictures) imitating the types of the respective displays. That is, the embedded display icon G11 has a design imitating the embedded display provided in the information processing apparatus 10 (for example, a notebook PC). On the other hand, the external display icon G12 has a design imitating the shape of the external display device 20. As a result, when selecting a display for displaying (screen area) by using the display selection icon G1, it is intuitive to know which icon is the selection for the embedded display and which icon is the selection for the external display, and the operability is good.

In addition, the display mode (for example, icon color (background color)) of the embedded display icon G11 and the external display icon G12 differs depending on whether or not the icon corresponds to the screen area in which a drag operation is started. For example, in the illustrated example, the background color of the embedded display icon G11 corresponding to the screen area where a drag operation is started is blue, but the background color of the external display icon G12 other than the screen area where the drag operation is started is gray.

Here, the types of display modes of the display selection icons G1 that are changed according to conditions will be described with reference to FIG. 8.

FIG. 8 is a view illustrating a list of display modes of display selection icons according to one or more embodiments.

(A1) to (A4) illustrate examples of the display mode of the embedded display icon G11, and (B1) to (B4) illustrate examples of the display mode of the external display icon G12. As described above, the embedded display icon G11 and the external display icon G12 have different designs (figures, pictures) imitating the types of the respective displays.

Further, the embedded display icon G11 changes into four types of display modes (A1), (A2), (A3), and (A4) depending on whether or not the display (screen area) on which the drag operation has been started is selected. Here, the state in which the embedded display icon G11 is selected is, for example, a state in which the cursor CA that is being dragged is hovered over the embedded display icon G11. In a state in which the cursor CA that is being dragged is not hovered over the embedded display icon G11, the embedded display icon G11 is in an unselected state.

(A1) illustrates an example of the display mode when a drag operation is started on a display other than the embedded display (here, the external display) and the embedded display icon is not hovered, and for example, the background color is dark gray. (A2) illustrates an example of the display mode when a drag operation is started on a display other than the embedded display (here, the external display) and the embedded display icon is hovered, and for example, the background color is light gray.

(A3) illustrates an example of the display mode when a drag operation is started on the embedded display and the embedded display icon is not hovered, and for example, the background color is dark blue. (A4) illustrates an example of the display mode when a drag operation is started on the embedded display and the embedded display icon is hovered, and for example, the background color is light blue.

Similarly, the external display icon G12 changes into four types of display modes (B1), (B2), (B3), and (B4) depending on whether or not the display (screen area) on which a drag operation is started is selected. Here, the state in which the external display icon G12 is selected is, for example, a state in which the cursor CA that is being dragged is hovered over the external display icon G12. In a state in which the cursor CA that is being dragged is not hovered over the external display icon G12, the external display icon G12 is in an unselected state.

(B1) illustrates an example of the display mode when a drag operation is started on a display other than the external display (here, the embedded display) and the external display icon is not hovered, and for example, the background color is dark gray. (B2) illustrates an example of the display mode when a drag operation is started on a display other than the external display (here, the embedded display) and the external display icon is hovered, and for example, the background color is light gray.

(B3) illustrates an example of the display mode when a drag operation is started on the external display and the external display icon is not hovered, and for example, the background color is dark blue. (B4) illustrates an example of the display mode when a drag operation is started on the external display and the external display icon is hovered, and for example, the background color is light blue.

As described above, when selecting a display for displaying a window between the embedded display and external display, since the designs (figures, pictures) of the embedded display icon G11 and the external display icon G12 to be selected are different, and the display mode (for example, background color) of the icon on the display on which a drag operation is started is different from the display mode of the icon on the other display, it is easy to intuitively recognize which display each icon corresponds to, and operability is good.

In addition, when a display on which a window is to be displayed is selected between the embedded display and the external display by operating a display selection icon G1, display information indicating that the display has been selected is displayed within the screen area of the selected display. For example, a frame surrounding the inner periphery of the screen area of the selected display is displayed in a predetermined color (for example, red).

Figure 9:
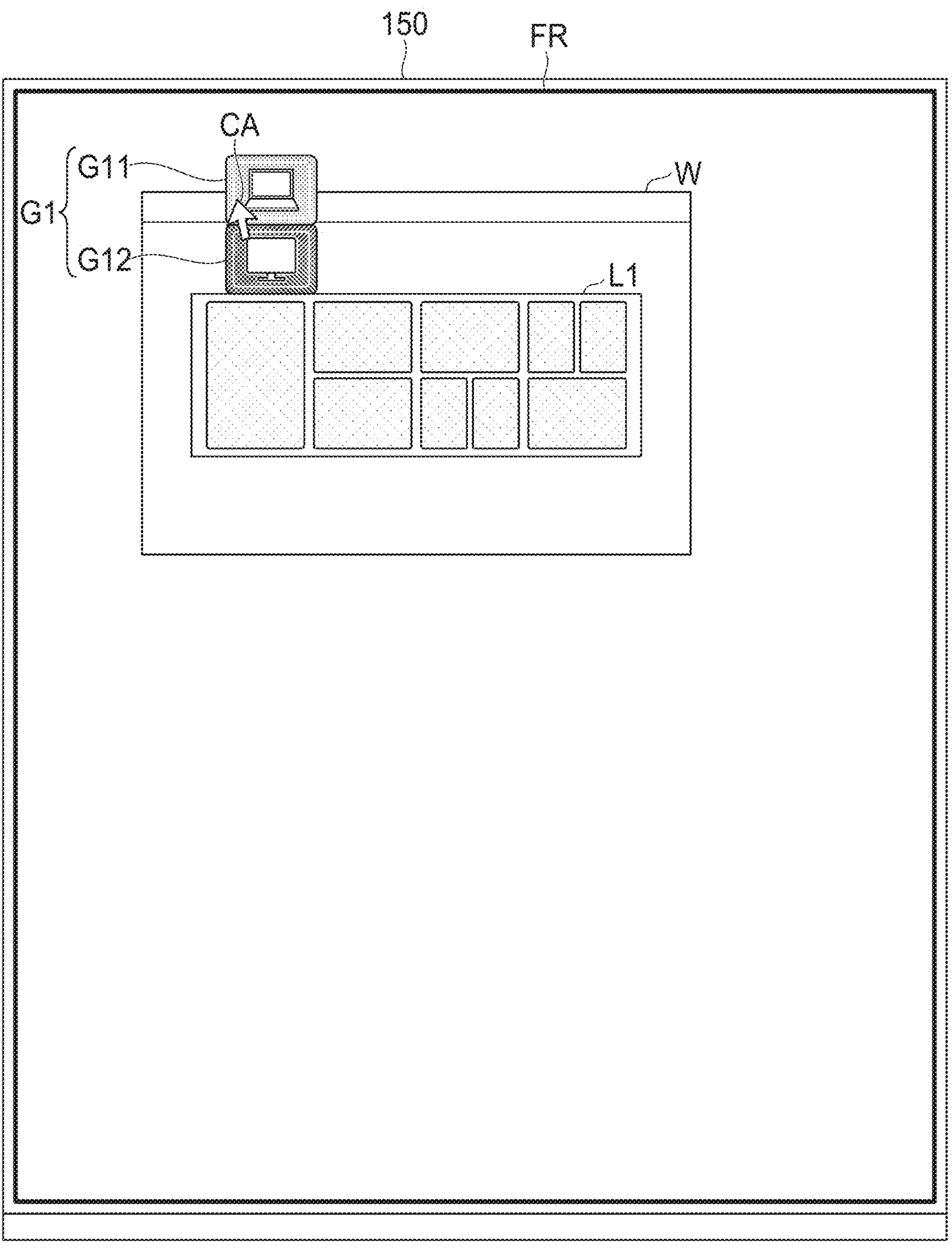
FIG. 9 is a view illustrating a display example when the embedded display is selected by using the display selection icons according to one or more embodiments.

FIG. 9 is a view illustrating a display example when the embedded display is selected by using the display selection icons according to one or more embodiments. As illustrated in the figure, when the cursor CA being dragged is hovered over the embedded display icon G11, the embedded display is selected. When the embedded display is selected, a red frame FR (red frame) indicating that the display has been selected is displayed within the screen area of the embedded display (display 150). As a result, it is easy to intuitively understand that the embedded display is selected.

When the cursor CA being dragged is hovered over the external display icon G12, the external display is selected. When the external display is selected, the red frame FR illustrated in FIG. 9 is not displayed within the embedded display, but is displayed on the external display (display 250).

Figure 10:
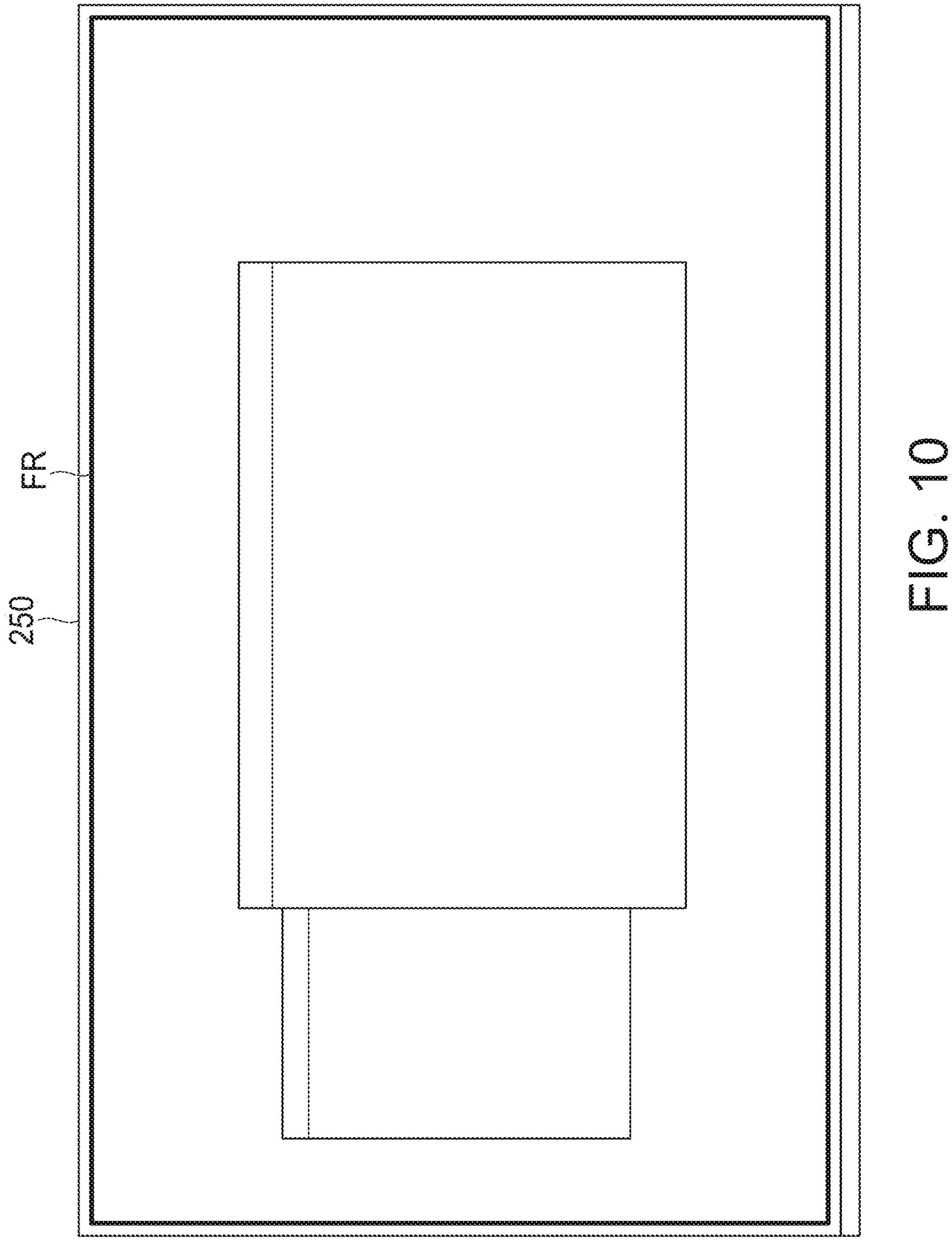
FIG. 10 is a view illustrating a display example when an external display is selected by using the display selection icons according to one or more embodiments.

FIG. 10 is a view illustrating a display example when an external display is selected by using the display selection icons according to one or more embodiments. This figure illustrates that when the external display (display 150) is selected by using the embedded display illustrated in FIG. 9, the red frame FR is displayed within the screen area of the external display (display 250).

In addition, when the embedded display is selected, as illustrated in FIG. 9, a layout selection icon is displayed, from which a display area in each layout within the screen area of the embedded display can be selected. The layout selection icon L1 or the layout selection icon L2 is displayed depending on whether the usage form at that time is "Portrait (or Clamshell)" or "Landscape". Here, the layout selection icon L1 displayed when "Portrait (or Clamshell)" is selected is illustrated as an example. By selecting the display area of one of the layouts of this layout selection icon L1 as illustrated in FIGS. 5A-5B, the window that is being dragged is displayed in the display area of the selected layout.

As for the layout selection icon displayed when the external display icon G12 is selected, if the aspect ratio of the screen of the external display is vertical, the layout selection icon L1 is displayed, and if the aspect ratio of the screen of the external display is horizontal, the layout selection icon L2 is displayed. In the case of an external display equipped with a rotation function, if the aspect ratio of the screen changes due to rotation, the displayed layout selection icon will also change.

Also, even if there is no external display connected and only the embedded display, when a drag operation is performed on a window of an application, the display selection icons G1 that include only the embedded display icon G11 among the embedded display icon G11 and the external display icon G12 illustrated in FIG. 7 may be displayed. When a drag operation is started, if the layout selection icon L1 or the layout selection icon L2 is directly displayed without displaying the display selection icon G1, a relatively wide area within the screen area will be occupied, but since the user may simply want to move a window, the smaller the initial occupied area is, the more likely it is to avoid erroneous operations (unintentional snaps).

Figure 11:
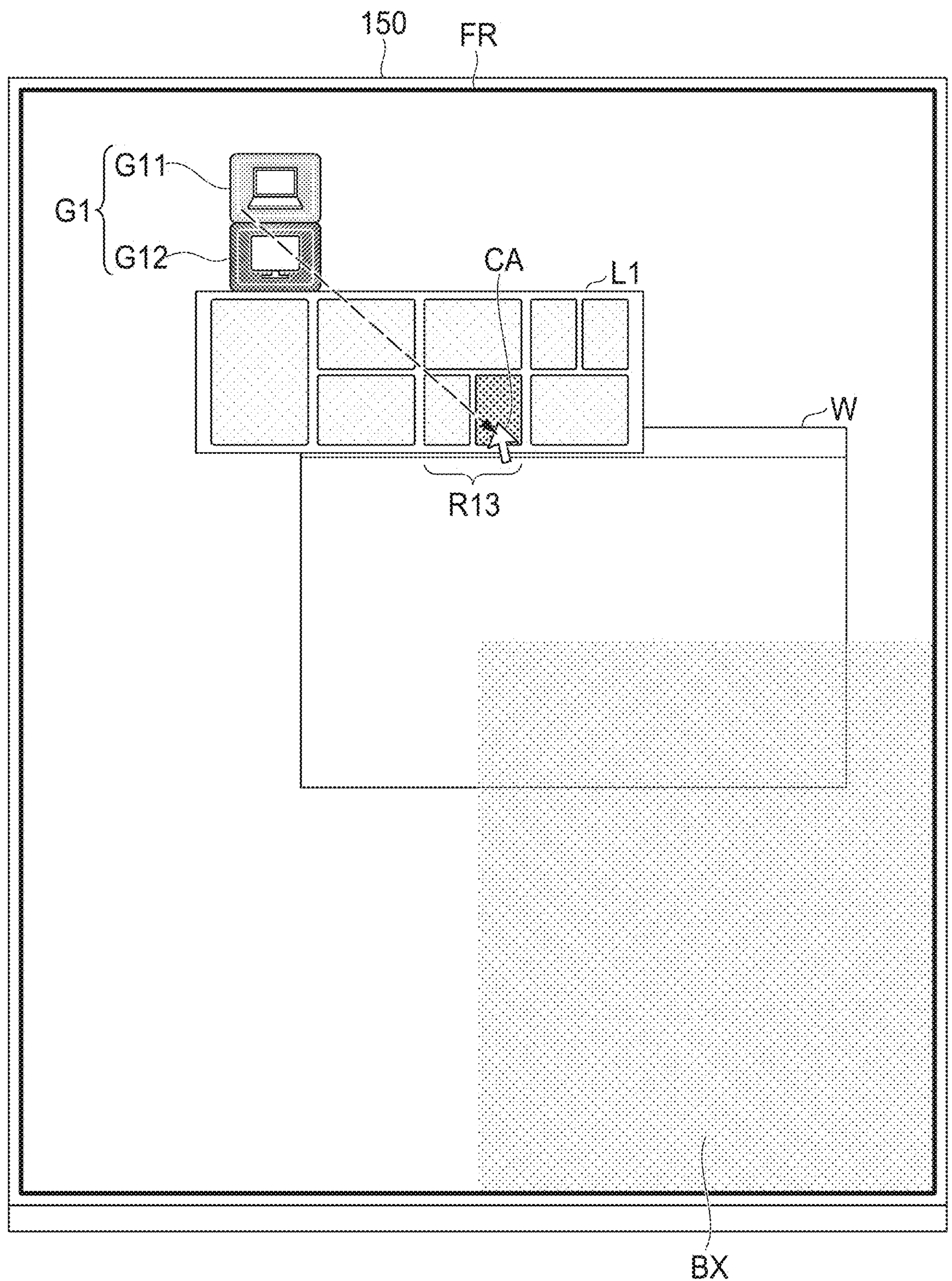
FIG. 11 is a view illustrating a display example when a layout (display area) is selected by using the layout selection icons according to one or more embodiments.

FIG. 11 is a view illustrating a display example when a layout (display area) is selected by using the layout selection icons according to one or more embodiments. As illustrated in the figure, when the cursor CA that has been hovered over the embedded display icon G11 by the drag operation on a window is hovered over one of the display areas included in the layout selection icon L1 by continuing the drag operation, it is possible to select the display area over which the cursor CA is hovered.

In the example illustrated in the figure, by hovering the cursor CA being dragged over the lower right display area of the three display areas indicated by the reference numeral R13 of the layout selection icon L1, the lower right display area is selected. As a result, display information indicating that the display area has been selected is displayed in the lower right display area (area corresponding to the selected display area) of the screen area of the embedded display (display 150). For example, translucent display information (translucent box BX) indicating an area corresponding to the selected display area is displayed. As a result, the selected display area (the area on which the window being dragged is to be displayed) can be easily and intuitively recognized.

For example, when this translucent box BX is displayed, the red frame FR indicating the selected display is also displayed. In the example illustrated in FIG. 11, since the embedded display is selected, both the red frame FR and the translucent box BX are displayed within the screen area of the embedded display (display 150), but when the external display is selected, both the red frame FR and the translucent box BX are displayed within the screen area of the external display (display 250).

As described above, by displaying the red frame FR, it is possible to easily and intuitively understand which display is selected, and further by displaying the translucent box BX, it is easy to intuitively know which display area is selected, and therefore it is possible to improve the operability when selecting a display destination area from among screen areas of a plurality of displays.

Figure 12:
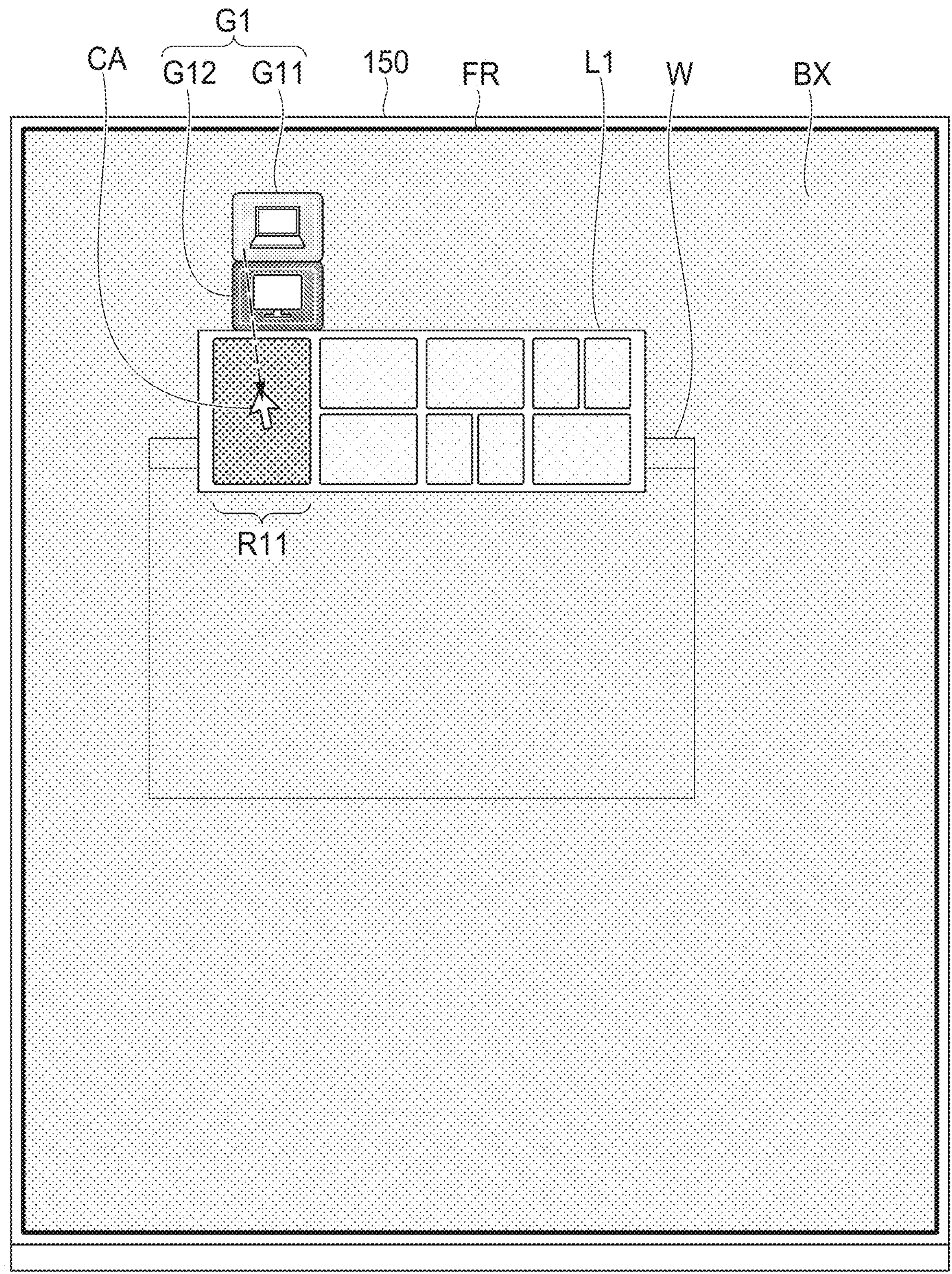
FIG. 12 is a view illustrating another display example when a layout (display area) is selected by using the layout selection icons according to one or more embodiments.

FIG. 12 is a view illustrating another display example when a layout (display area) is selected by using the layout selection icons according to one or more embodiments. As illustrated in the figure, when the cursor CA that has been hovered over the embedded display icon G11 (see FIG. 9) by the drag operation on a window is hovered over the display area indicated by the reference numeral R11 of the layout selection icon L1 by continuing the drag operation, the entire display area of the screen area is selected, and the translucent box BX is displayed in the entire display area.

When a drag operation is completed on a window with one of the display areas of the layout selection icons selected, the display selection and layout (display area) selection are confirmed, and the window being dragged is displayed in the display area within the screen area of the selected display (the display position is changed).

On the other hand, when a drag operation is completed on a window with the drag operation cursor CA hovered over one of the display selection icons and none of the display areas of the layout selection icons selected (see FIG. 9), the window is displayed at a predetermined position in the screen area of the display selected by the display selection icon (the display position is changed).

Figure 13:
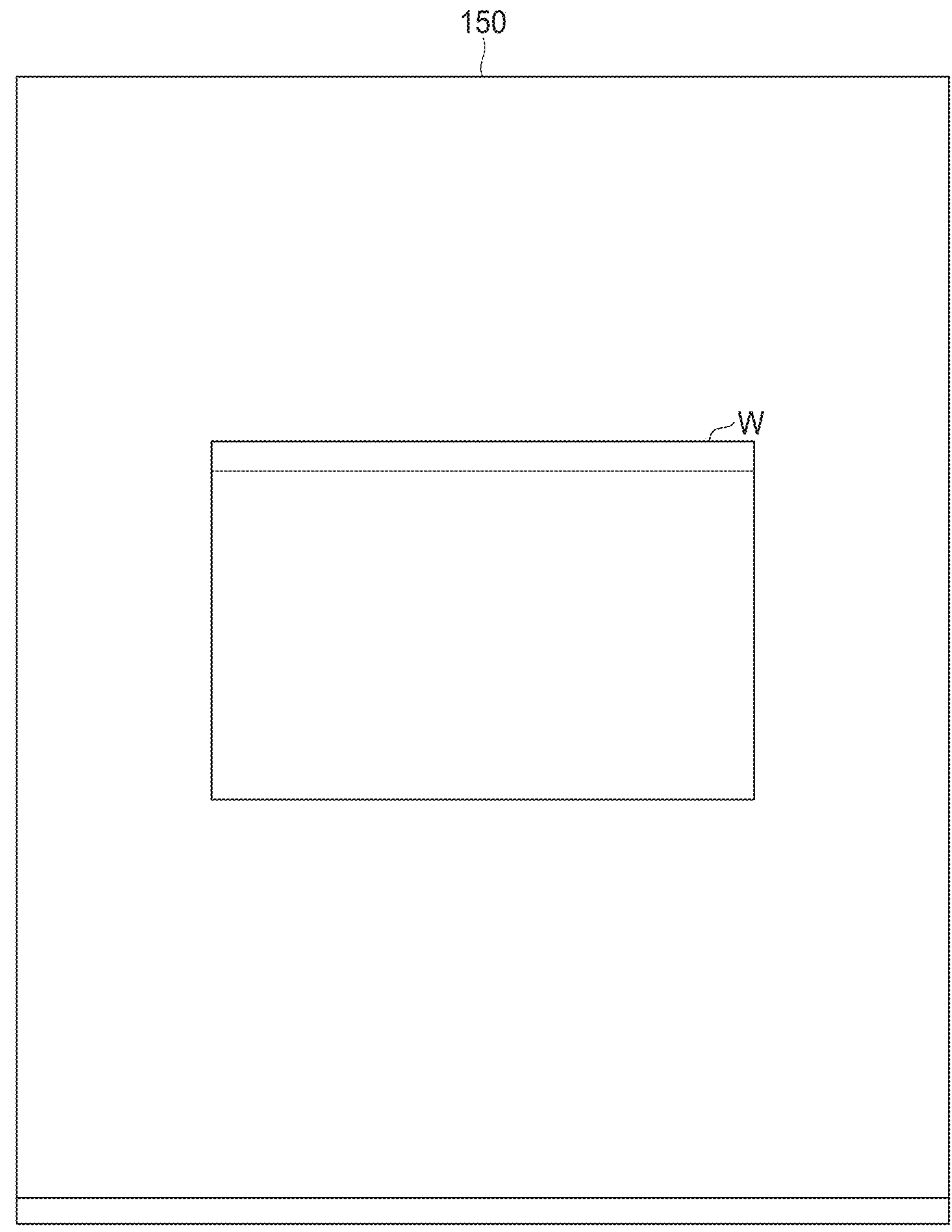
FIG. 13 is a view illustrating a display example when a drag operation is completed on the display selection icons according to one or more embodiments.

FIG. 13 is a view illustrating a display example when a drag operation is completed on the display selection icons according to one or more embodiments. For example, it is assumed that a drag operation is completed on a window with the cursor CA being dragged is hovered over the embedded display icon G11 and none of the display areas of the layout selection icon L1 selected (see FIG. 9). In that case, as illustrated in FIG. 13, the window is displayed at a predetermined position (for example, a center position) in the screen area of the embedded display (display 150) at a predetermined size smaller than the maximum size. Thereafter, when the window is moved from this predetermined position (for example, a center position), the window may return to the original size thereof before the drag operation is completed. The position is not limited to the center of the screen area, but may be any position such as a position near the top left of the screen area.

In addition, the display example illustrated in FIG. 13 is an example, the window may be maximized and displayed in the screen area of the selected display, or may be displayed without changing the size of the window when the drag operation is performed. In addition, when the window size when the drag operation is performed is larger than the maximum size, the window size may be maximized or changed to a predetermined size smaller than the maximum size.

Configuration of Information Processing Apparatus

Hereinafter, a specific configuration of the information processing apparatus 10 will be described.

Figure 14:
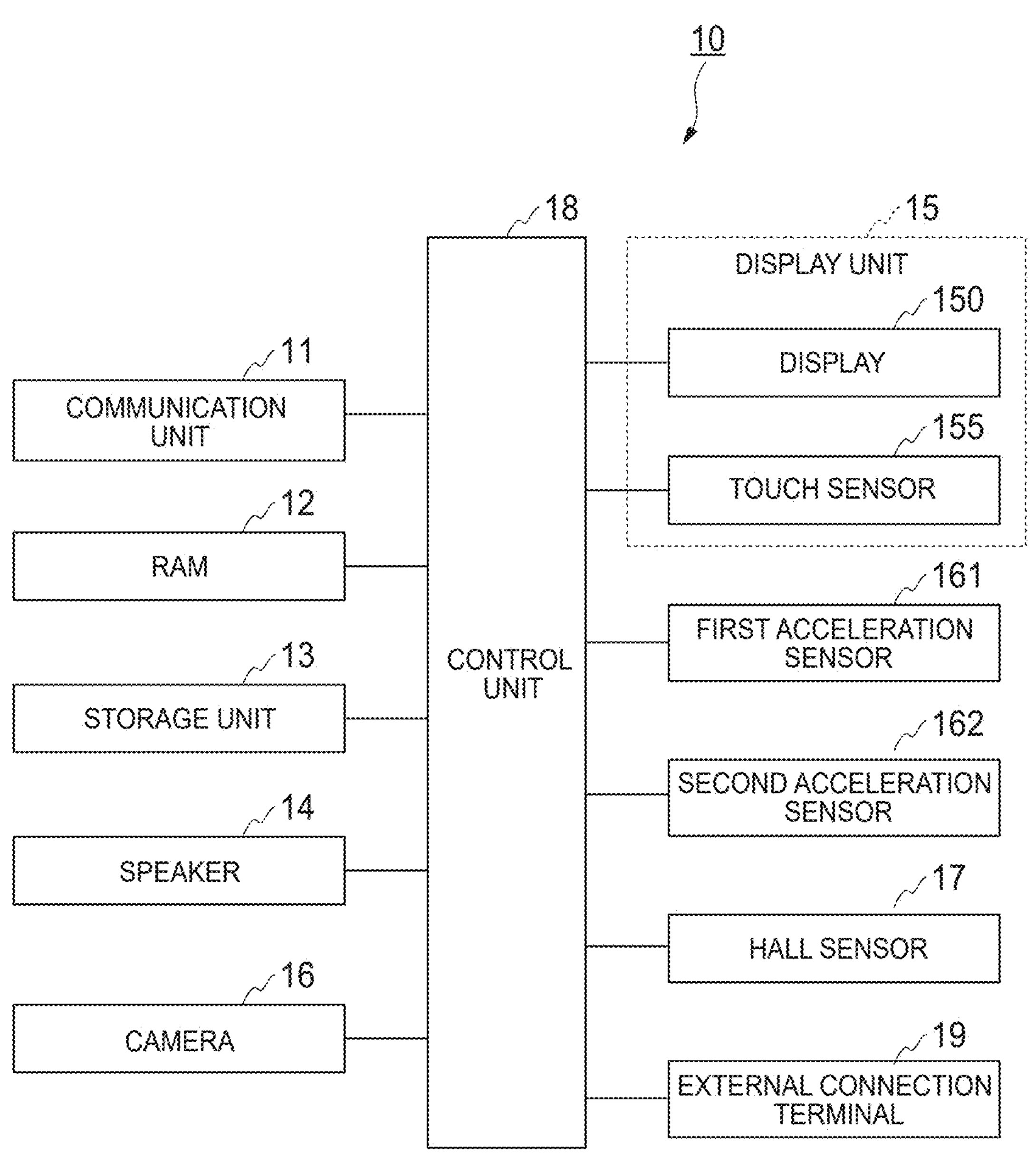
FIG. 14 is a block view illustrating an example of a hardware configuration of the information processing apparatus according to one or more embodiments.

FIG. 14 is a block view illustrating an example of a hardware configuration of the information processing apparatus 10 according to one or more embodiments. The information processing apparatus 10 includes a communication unit 11, a random access memory (RAM) 12, a storage unit 13, a speaker 14, a display unit 15, a camera 16, a first acceleration sensor 161, and a second acceleration sensor 162, a hall sensor 17, a control unit 18, and an external connection terminal 19. These units are communicably connected to each other via a bus or the like.

The communication unit 11 includes, for example, digital input/output ports such as a plurality of Ethernet (registered trademark) ports or a plurality of universal serial buses (USB), and a communication device that performs wireless communication such as Bluetooth (registered trademark) or Wi-Fi (registered trademark). For example, the communication unit 11 can communicate with the external keyboard 30 or the like described above by using Bluetooth (registered trademark).

A program or data for the process executed by the control unit 18 is loaded in the RAM 12, and various types of data are saved or deleted as appropriate. For example, the RAM 12 also functions as a display video memory (V-RAM) for display of the display 150. As an example, the RAM 12 functions as a video memory for data displayed in each display area within the screen area of the display 150 (or the display 250 when the external display device 20 is connected). In addition, the RAM 12 stores information about running apps, which apps are being used among running apps (apps in active windows), information about other apps in inactive windows, information such as in which display area each window is displayed, in which layer each window is arranged, the size of the window, and whether or not the window is minimized. Since the RAM 12 is a volatile memory, the data is not held when the supply of power to the RAM 12 is stopped. The data that needs to be held when the supply of power to the RAM 12 is stopped is transferred to the storage unit 13.

The storage unit 13 includes any one or more of a solid state drive (SSD), a hard disk drive (HDD), a read only memory (ROM), a Flash-ROM, and the like. For example, the storage unit 13 saves a program or setting data of a basic input output system (BIOS), a program of an operating system (OS) or an app operating on the OS, various types of data used in the app, and the like.

The speaker 14 outputs an electronic sound, a voice, or the like.

The display unit 15 is provided with the display 150 and a touch sensor 155. As described above, the display 150 is a flexible display that can be bent according to the opening angle θ due to the relative rotation of the first chassis 101 and the second chassis 102. The display 150 performs display corresponding to each display mode described with reference to FIG. 4 according to the control of the control unit 18. The touch sensor 155 is provided on the screen of the display 150, and detects the touch operation on the screen. For example, the touch sensor 155 detects the touch operation on the display area DA in the one-screen mode. In addition, the touch sensor 155 detects the touch operation on one or both of the first display area DA1 and the second display area DA2 in the two-screen mode. A tap operation, a slide operation, a flick operation, a swipe operation, a pinch operation, and the like are included in the touch operation. The touch sensor 155 detects the touch operation to output operation information based on the detected operation to the control unit 18.

The camera 16 includes a lens, an imaging element, and the like. The camera 16 captures an image (a still image or a moving image) according to the control of the control unit 18 to output data of the captured image.

The first acceleration sensor 161 is provided inside the first chassis 101, and detects the orientation of the first chassis 101 and the change in the orientation. For example, assuming that a direction parallel to a longitudinal direction of the first display area DA1 is an X1 direction, a direction parallel to a lateral direction is a Y1 direction, and a direction perpendicular to the X1 direction and the Y1 direction is a Z1 direction, the first acceleration sensor 161 detects acceleration in each of the X1 direction, the Y1 direction, and the Z1 direction to output the detection result to the control unit 18.

The second acceleration sensor 162 is provided inside the second chassis 102, and detects the orientation of the second chassis 102 and the change in the orientation. For example, assuming that a direction parallel to a longitudinal direction of the second display area DA2 is an X2 direction, a direction parallel to a lateral direction is a Y2 direction, and a direction perpendicular to the X2 direction and the Y2 direction is a Z2 direction, the second acceleration sensor 162 detects acceleration in each of the X2 direction, the Y2 direction, and the Z2 direction to output the detection result to the control unit 18.

The hall sensor 17 is provided to detect the connection with the keyboard 30. For example, when the keyboard 30 is placed on the second display area DA2 of the second chassis 102, a magnetic field is changed due to approaching of the magnet provided in the inner portion of the bottom surface of the keyboard 30, and the detection value (output value) of the hall sensor 17 is changed. In other words, the hall sensor 17 outputs different detection results according to whether or not the keyboard 30 is placed. Here, the hall sensor 17 is used to detect whether or not the keyboard 30 is placed, but the detection method is not limited thereto, and any detection method can be used.

The external connection terminal 19 is a connection terminal for connecting to the external display device 20 (external display). For example, the external connection terminal 19 is an HDMI (registered trademark) terminal, a USB Type-C terminal, a display port, or the like. The information processing apparatus 10 and the external display device 20 may be connected wirelessly.

The control unit 18 includes a processor such as a central processing unit (CPU), a graphic processing unit (GPU), or a microcomputer, and realizes various functions by the processor executing the programs (various programs such as the BIOS, the OS, and the app operating on the OS) stored in the storage unit 13 or the like. For example, the control unit 18 detects the posture (orientation) of the information processing apparatus 10 based on the detection results of the first acceleration sensor 161 and the second acceleration sensor 162. In addition, the control unit 18 detects, based on the detection results of the first acceleration sensor 161 and the second acceleration sensor 162, whether the information processing apparatus 10 is in the open state or closed state, and whether the information processing apparatus 10 is in the bent form or the flat form in the open state, or the like.

In addition, the control unit 18 detects the connection with the keyboard 30 based on the detection result of the hall sensor 17. The connection with the keyboard 30 refers to the placement of the keyboard 30 on the second display area DA2, and does not refer to communication connection. The control unit 18 detects the communication connection with the keyboard 30 by using a function of Bluetooth (registered trademark) or the like.

In addition, the control unit 18 controls the display of the display 150 described with reference to FIG. 4 by detecting the state of the system, the posture (orientation) of the information processing apparatus 10, whether the information processing apparatus 10 is in the open or closed state, whether the information processing apparatus 10 is in the bent form or flat form in the open state, whether the information processing apparatus 10 is connected to the keyboard 30, and the like.

Further, by dragging a window displayed on the display 150 (embedded display) or the display 250 (external display), the control unit 18 displays a display selection icon or a layout selection icon for selecting the display destination and screen layout of the window (see FIGS. 5A to 9).

Next, in the processing executed by the control unit 18, the display layout change processing of changing the display destination and layout of the window by using the display selection icon and the layout selection icon will be described in detail. In the following description, as illustrated in FIG. 6, the information processing apparatus 10 will be described as being connected to the external display device 20 and controlling display of the embedded display and the external display.

Figure 15:
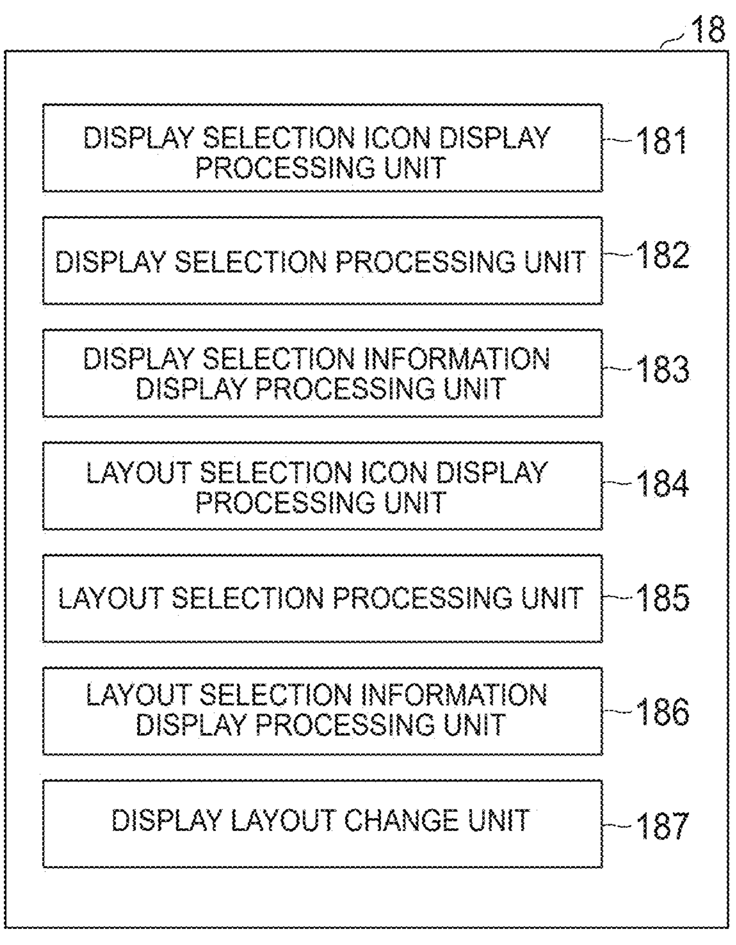
FIG. 15 is a block view illustrating an example of a functional configuration of the information processing apparatus according to one or more embodiments.

FIG. 15 is a block view illustrating an example of a functional configuration related to the display layout change processing of the information processing apparatus 10 according to one or more embodiments. As a functional configuration in which the CPU executes processing based on the OS, programs running on the OS, or the like, the control unit 18 includes a display selection icon display processing unit 181, a display selection processing unit 182, a display selection information display processing unit 183, a layout selection icon display processing unit 184, a layout selection processing unit 185, a layout selection information display processing unit 186, and a display layout change unit 187.

The display selection icon display processing unit 181 performs a display process of display selection icons. For example, when a drag operation is accepted for a window displayed on at least one of the screen area of the embedded display and the screen area of the external display, the display selection icon display processing unit 181 displays the display selection icons G1 in the screen area in which a drag operation is started (see FIG. 7). The display selection icons G1 include an embedded display icon G11 corresponding to the screen area of the embedded display, and an external display icon G12 corresponding to the screen area of the external display.

For example, the display selection icon display processing unit 181 displays the embedded display icon G11 and the external display icon G12 in different designs imitating the types of the respective displays (see FIGS. 7 and 8).

In addition, the display selection icon display processing unit 181 makes the display modes of the icon corresponding to the screen area in which a drag operation is started between the embedded display icon G11 and the external display icon G12 and the other icon different from each other. For example, the display selection icon display processing unit 181 makes the colors (for example, background color) of the icon corresponding to the screen area in which a drag operation is started between the embedded display icon G11 and the external display icon G12 and the other icon different from each other (see FIG. 8).

In addition, the display selection icon display processing unit 181 makes the display modes different from each other when the embedded display icon G11 is selected by a drag operation and when the embedded display icon G11 is not selected, and when the external display icon G12 is selected by a drag operation and when the external display icon G12 is not selected (see FIG. 8).

For example, when the icon corresponding to the screen area in which a drag operation is started is the embedded display icon G11, the display selection icon display processing unit 181 sets the background color of the embedded display icon G11 to blue, and sets the background color of the external display icon G12 to gray. At this time, the display selection icon display processing unit 181 changes the background color of the embedded display icon G11 to, for example, dark blue when a drag operation is started (when unselected), and to, for example, light blue when selected. In addition, the display selection icon display processing unit 181 changes the background color of the external display icon G12 to, for example, dark gray when a drag operation is started (when unselected), and to, for example, light gray when selected.

Further, for example, when the icon corresponding to the screen area in which a drag operation is started is the external display icon G12, the display selection icon display processing unit 181 sets the background color of the external display icon G12 to blue, and sets the background color of the embedded display icon G11 to gray. At this time, the display selection icon display processing unit 181 changes the background color of the external display icon G12 to, for example, dark blue when a drag operation is started (when unselected), and to, for example, light blue when selected. In addition, the display selection icon display processing unit 181 changes the background color of the embedded display icon G11 to, for example, dark gray when a drag operation is started (when unselected), and to, for example, light gray when selected.

The display selection processing unit 182 selects a display corresponding to the icon selected by the drag operation between the embedded display icon G11 and the external display icon G12 as a display for displaying the window being dragged. For example, the display selection processing unit 182 selects a display corresponding to the icon selected by the user hovering the cursor CA being dragged (operation position) over either the embedded display icon G11 or the external display icon G12, as a display for displaying the window being dragged.

The display selection information display processing unit 183 displays the red frame FR indicating that the display has been selected within the screen area of the display selected by the display selection processing unit 182 between the embedded display icon G11 and the external display icon G12 (see FIGS. 9 and 10). For example, the display selection information display processing unit 183 displays the red frame FR to surround the inner periphery of the screen area of the selected display.

The layout selection icon display processing unit 184 newly displays a layout selection icon from which a display area in which a window is to be displayed can be selected within the screen area selected by the display selection processing unit 182 (see FIG. 9). For example, the layout selection icon display processing unit 184 displays the layout selection icon L1 illustrated in FIG. 5A when the usage form is “Portrait (or Clamshell)”, and displays the layout selection icon L2 illustrated in FIG. 5B when the usage form is “Landscape”.

The layout selection processing unit 185 selects the display area selected by the drag operation on the layout selection icon as a display area for displaying the window being dragged. For example, the layout selection processing unit 185 selects the display area selected by the user hovering the cursor CA being dragged (operation position) over one of the display areas included in the layout selection icon as a display area for displaying the window being dragged.

The layout selection information display processing unit 186 displays the translucent box BX indicating that the display area has been selected in the display area selected by the layout selection processing unit 185 (see FIGS. 11 and 12). For example, the layout selection information display processing unit 186 displays the translucent box BX in an area corresponding to the display area selected by the layout selection processing unit 185 within the screen area of the display selected by the display selection processing unit 182.

When a drag operation is completed on a window with any display area selected by the layout selection processing unit 185, the display layout change unit 187 changes the display position of the window being dragged and displays the window in the display area selected by the layout selection processing unit 185 within the screen area of the display selected by the display selection processing unit 182. The state in which any one of the display areas is selected by the layout selection processing unit 185 is, for example, a state in which the cursor CA being dragged (operation position) is hovered over any one of the display areas included in the layout selection icon.

In addition, when a drag operation is completed on a window with one of the displays selected by the display selection processing unit 182 and no display area selected by the layout selection processing unit 185, the display layout change unit 187 changes the display position (for example, a center position) of the window being dragged and displays the window at a predetermined position in the screen area of the display selected by the display selection processing unit 182 (see FIG. 13). The state in which one of the displays is selected by the display selection processing unit 182 is, for example, a state in which the cursor CA being dragged (operation position) is hovered over either the embedded display icon G11 or the external display icon G12.

In addition, when a drag operation is completed on a window with one of the displays selected by the display selection processing unit 182 and no display area selected by the layout selection processing unit 185, the display layout change unit 187 sets the size of the window to be displayed at a predetermined position (for example, the center position) in the screen area of the display selected by the display selection processing unit 182 to a predetermined size smaller than the maximum size. In addition, when the user moves the window from this predetermined position (for example, the center position), the display layout change unit 187 may restore the original size before the drag operation is completed.

The display layout change unit 187 may maximize the size of the window to be displayed at a predetermined position (for example, a center position) of this screen area, or may not change the size of the window when the drag operation is performed. In addition, even if the size of the window is not changed, in a case where the size of the window when the drag operation is performed is larger than the maximum size, the display layout change unit 187 may change the size to the maximum size or to a predetermined size smaller than the maximum size.

Operation of Display Layout Change Processing

Next, the operation of the display layout change processing executed by the control unit 18 will be described.

Figure 16:
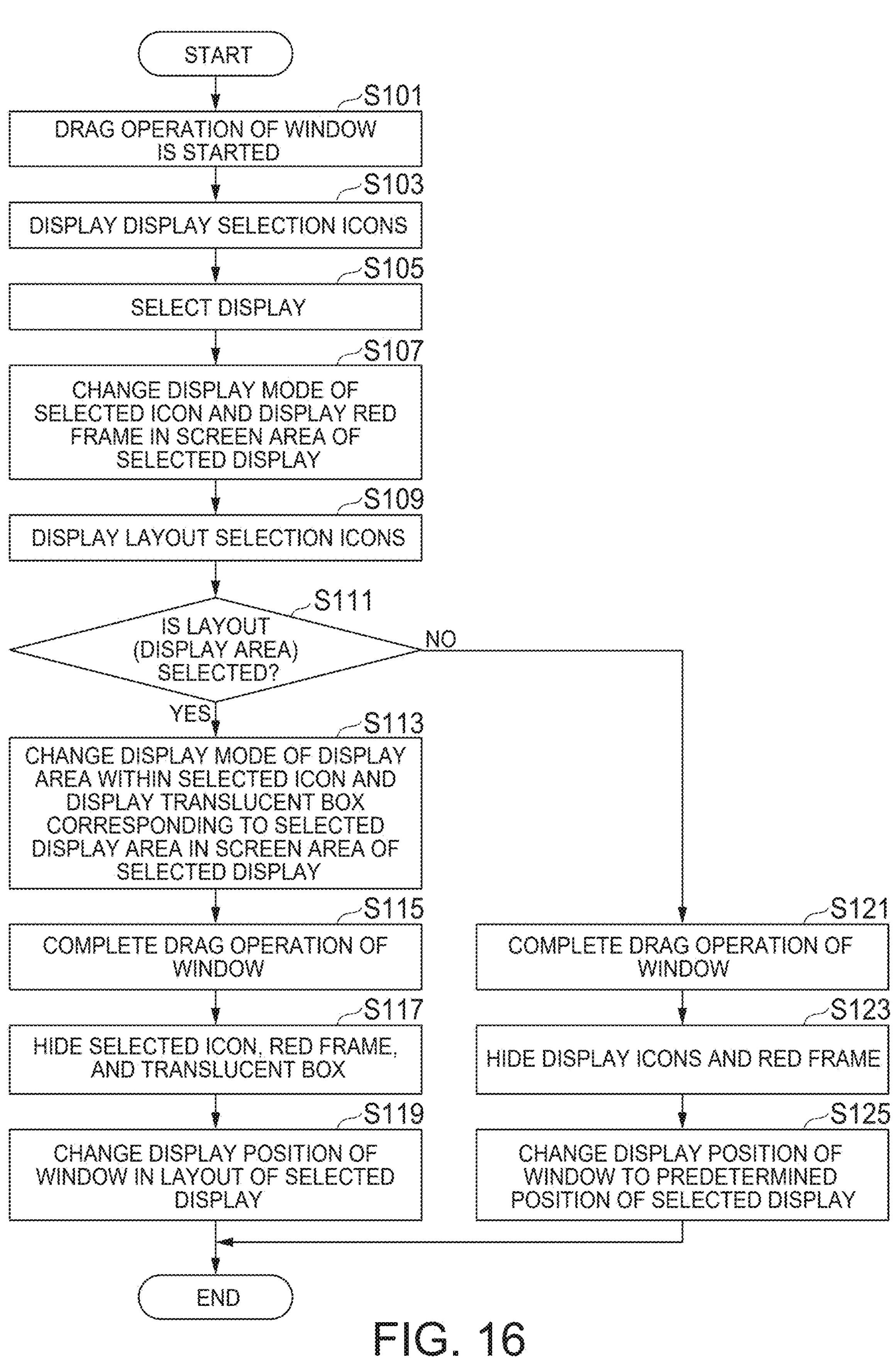
FIG. 16 is a flowchart illustrating an example of a display layout change processing according to one or more embodiments.

FIG. 16 is a flowchart illustrating an example of display layout change processing according to one or more embodiments.

(Step S101) When the control unit 18 accepts that a drag operation has been started on the window displayed on the screen area of the embedded display or the external display, the process advances to step S103.

(Step S103) the control unit 18 displays the display selection icons G1 on the screen area of the display on which the drag operation is started, between the embedded display and the external display (see FIG. 7). For example, the control unit 18 displays the embedded display icon G11 and the external display icon G12 included in the display selection icons G1 with different designs (figures, pictures) imitating the types of the respective displays (see FIG. 7). Then, the process advances to step S105.

(Step S105) The control unit 18 selects the screen area corresponding to the icon selected by a drag operation between the embedded display icon G11 and the external display icon G12 as a screen area of a display for displaying the window being dragged (see FIG. 9). For example, the control unit 18 selects a display corresponding to the icon selected by the user hovering the cursor CA being dragged (operation position) over either the embedded display icon G11 or the external display icon G12 as a display for displaying the window being dragged. Then, the process advances to step S107.

(Step S107) The control unit 18 changes the display mode of the icon selected in step S105. For example, the control unit 18 changes the background color of the icon selected between the embedded display icon G11 and the external display icon G12 from dark blue to light blue, or from dark gray to light gray (see FIGS. 8 and 9). In addition, in step S105, the control unit 18 displays the red frame FR indicating that the display has been selected within the screen area of the display selected in step S105 (see FIGS. 9 and 10). Then, the process advances to step S109.

(Step S109) The control unit 18 newly displays a layout selection icon from which a display area in which a window is to be displayed can be selected within the screen area of the display selected in step S105 (see FIG. 9). For example, the control unit 18 displays the layout selection icon L1 illustrated in FIG. 5A when the usage form is "Portrait (or Clamshell)", and displays the layout selection icon L2 illustrated in FIG. 5B when the usage form is "Landscape". Then, the process advances to step S111.

(Step S111) The control unit 18 determines whether or not a layout (display area) is selected by the drag operation on the layout selection icon. For example, the control unit 18 determines that a layout (display area) is selected when the user hovers the cursor CA being dragged (operation position) over any of the display areas included in the layout selection icon, and determines that no layout (display area) is selected when the cursor CA (operation position) for the drag operation does not overlap any of the display areas included in the layout selection icon. When it is determined that a layout (display area) is selected (YES), the control unit 18 selects the display area selected by the drag operation on the layout selection icon as a display area for displaying the window being dragged, and the process advances to step S113. On the other hand, when the control unit 18 determines that no layout (display area) is selected (NO), the process advances to step S121.

(Step S113) The control unit 18 changes the display mode (color, brightness, or the like) of the display area within the layout selection icon selected in step S111. In addition, the control unit 18 displays the translucent box BX corresponding to the display area selected in step S111 in the screen area of the display selected in step S105 (see FIG. 10). Then, the process advances to step S115.

(Step S115) When the control unit 18 accepts that a drag operation has been completed on a window with one of the display areas included in the layout selection icon selected, the process advances to step S117.

(Step S117) The control unit 18 hides the displayed selection icon (display selection icon G1, layout selection icon L1 or L2), the red frame FR, and the translucent box BX. Then, the process advances to step S119.

(Step S119) The control unit 18 changes the display position of the window to a display area within the screen area of the selected display.

(Step S121) When the control unit 18 accepts that a drag operation has been completed on a window with one of the displays selected by the display selection processing unit 182 and a display area not selected by the layout selection processing unit 185, the process advances to step S123.

(Step S123) The control unit 18 hides the displayed selection icon (display selection icon G1, layout selection icon L1 or L2) and the red frame FR. Then, the process advances to step S125.

(Step S125) The control unit 18 changes the display position of the window to a predetermined position in the screen area of the selected display, and displays the window at a predetermined size smaller than the maximum size, for example.

Summary of Embodiments

As described above, the information processing apparatus 10 according to one or more embodiments controls display on screen areas of a plurality of displays (for example, embedded display (display 150) and external display (display 250)). The information processing apparatus 10 includes the storage unit 13 (an example of a memory) that stores an application program, and the control unit 18 (for example, an example of a processor such as a CPU, GPU, or microcomputer) that executes the application program stored in the storage unit 13 to control displaying a window of an application on at least one of a plurality of displays. When a drag operation is accepted for a window displayed on at least one of the plurality of displays, the control unit 18 performs a first display process of displaying the display selection icon G1 (an example of a first icon) including the embedded display icon G11 and the external display icon G12 corresponding to each of the plurality of displays on the display on which the drag operation is started. In addition, the control unit 18 performs a first selection process of selecting a display corresponding to the icon selected by hovering the cursor CA being dragged (an example of operation position) over either the embedded display icon G11 or the external display icon G12 corresponding to the plurality of displays, as a display for displaying the window being dragged. In addition, the control unit 18 performs a second display process of displaying the layout selection icon L1 or L2 (an example of a second icon) from which a display area can be selected, in which a window is to be displayed within the screen area of the display selected in the first selection process. Further, the control unit 18 performs a second selection process of selecting the display area selected by the drag operation on the layout selection icon L1 or L2 as a display area for displaying the window being dragged. In addition, when a drag operation is completed on a window with the cursor CA being dragged hovered over either the embedded display icon G11 or the external display icon G12 and no display area selected by the second selection process, the control unit 18 performs a third display process of displaying the window at a predetermined position (for example, a center position) in the screen area of the display selected by the first selection process. In addition, when a drag operation is completion on a window with any display area selected by the second selection process, the control unit 18 performs a fourth display process of displaying the window in the display area selected by the second selection process within the screen area of the display selected by the first selection process.

As a result, in the information processing apparatus 10, when the user simply wants to change the display for displaying a window, if he or she selects only a display and does not select a layout (display area), it is possible to move the window to a predetermined position in the screen area of the selected display. In addition, in the information processing apparatus 10, when the user selects both a display and a layout (display area), it is possible to display a window in a display area within a desired screen area of the display. Therefore, the information processing apparatus 10 can improve the operability of selecting a display destination when using a plurality of displays.

In addition, display area options that can be selected by the drag operation on the layout selection icon L1 or L2 include an option in which a display area is selectable, which is obtained by splitting the screen area of the display selected by the first selection process into a plurality of areas (see reference numerals R12 to R14 in FIG. 5A and reference numerals R22 to R24 in FIG. 5B), and an option in which the entire screen area is selectable as a display area (see reference numeral R11 in FIG. 5A and reference numeral R21 in FIG. 5B).

As a result, in the information processing apparatus 10, it is possible to select a display and maximize a window by using the same operations as when selecting a layout (display area).

In addition, for example, in the third display process, the control unit 18 displays a window at the center position of the screen area of the display selected by the first selection process.

As a result, in the information processing apparatus 10, when the user wants to change the display for displaying a window, if he or she selects only a display and does not select a layout (display area), it is possible to move the window to a center position in the screen area of the selected display.

In addition, for example, in the third display process, the control unit 18 displays the window at a predetermined size smaller than the maximum size at a predetermined position in the screen area of the display selected by the first selection process.

As a result, in the information processing apparatus 10, when the user simply wants to change the display for displaying a window, if he or she selects only a display and does not select a layout (display area), it is possible to move the window to the screen area of the selected display. In addition, for example, in the third display process, the control unit 18 may maximize and display the window in the screen area of the display selected by the first selection process.

As a result, in the information processing apparatus 10, when the user wants to change the display for displaying a window, it is possible to maximize the size of the window after changing the display to make the window easier to be used.

In addition, for example, in the third display process, the control unit 18 may display the window at a predetermined position in the screen area of the display selected by the first selection process without changing the size when the drag operation is performed.

As a result, in the information processing apparatus 10, when the user wants to change the display for displaying a window, since it is possible to change only the display while keeping the size the same, it is possible to continue to make the window easier to be used.

When the size of the window when the drag operation is performed is larger than the maximum size, in the third display process, the control unit 18 may change the size of the window to be displayed in the screen area of the display selected by the first selection process, and may display the window at the maximum size or a predetermined size smaller than the maximum size.

Accordingly, in the information processing apparatus 10, when the user wants to change the display for displaying the window, it is possible to change the size of the window to an appropriate size.

In addition, a control method in the information processing apparatus 10 according to one or more embodiments includes: via the control unit 18, when a drag operation is accepted for a window displayed on at least one of a plurality of displays, a first display step of displaying the display selection icons G1 (an example of the first icons) including the embedded display icon G11 and the external display icon G12 corresponding to the plurality of displays on the display on which the drag operation is started, a first selection step of selecting a display corresponding to the icon selected by hovering the cursor CA being dragged (an example of the operation position) over either the embedded display icon G11 or the external display icon G12 corresponding to the plurality of displays as a display area for displaying the window being dragged, a second display step of displaying the layout selection icon L1 or L2 (an example of the second icon) from which a display area is selectable, in which the window is to be displayed within a screen area of the display selected in the first selection step, a second selection step of selecting a display area selected by the drag operation on the second icon as a display area for displaying the window being dragged, when the drag operation is completed on the window with the cursor CA being dragged hovered over either the embedded display icon G11 or the external display icon G12 and no display area selected in the second selection step, a third display step of displaying the window at a predetermined position (for example, a center position) of a screen area of the display selected in the first selection step, and when the drag operation on the window is completed with any display area selected in the second selection step, a fourth display step of displaying the window in the display area selected in the second selection step within a screen area of the display selected in the first selection step.

As a result, with the control method in the information processing apparatus 10, when the user simply wants to change the display for displaying a window, if he or she selects only a display and does not select a layout (display area), it is possible to move the window to a predetermined position in the screen area of the selected display. In addition, with the control method of the information processing apparatus 10, when the user selects both a display and a layout (display area), it is possible to display a window in a display area within a desired screen area of the display. Therefore, with the control method of the information processing apparatus 10, it is possible to improve the operability of selecting a display destination when using a plurality of displays.

Although the embodiments of the present invention have been described above in detail with reference to the accompanying drawings, a specific configuration is not limited to the above-described configuration, and various design changes and the like can be made without departing from the gist of the present invention. For example, the configurations described in the above-described embodiments may be optionally combined.

In addition, in one or more embodiments described above, an example is illustrated in which the red frame FR (red frame) surrounding the inner periphery of the screen area of the display selected by the operation on the display selection icon G1 is displayed in the screen area of the display, but the color of the frame is not limited to red, but can be any color. For example, the color of the frame may be blue, green, and the like, or may be a color that stands out relatively compared to the average color of the content or background displayed on the screen (for example, a complementary color). In addition, in the screen area of the display selected by the operation on the display selection icon G1, display information other than a frame may be displayed as display information indicating that the display has been selected. For example, an icon indicating that the display has been selected may be displayed.

In addition, in one or more embodiments described above, an example is illustrated in which the translucent box BX is displayed as display information indicating an area corresponding to the display area selected by operating the layout selection icon L1 or L2, but display information other than the translucent box BX may be used. For example, a frame indicating an area corresponding to the selected display area may be displayed in a predetermined color. In that case, the color of the frame surrounding the inner periphery of the screen area of the display selected by operating the display selection icon G1 and the color of the frame indicating an area corresponding to the display area selected by operating the layout selection icon L1 or L2 may be different colors.

In addition, in one or more embodiments described above, an example is illustrated in which the translucent box BX is displayed as display information indicating an area corresponding to the display area selected by operating the layout selection icon L1 or L2, but the translucent box BX may also be displayed as display information indicating an area in which a window is to be displayed when the drag operation is completed on the display selection icon G1. For example, when the cursor CA being dragged is hovered over the embedded display icon G11 included in the display selection icon G1, the information processing apparatus 10 may display the translucent box BX at a predetermined position (for example, a center position) in the screen area of the embedded display (display 150). In addition, when the cursor CA being dragged is hovered over the external display icon G12 included in the display selection icon G1, the information processing apparatus 10 may display the translucent box BX at a predetermined position (for example, a center position) in the screen area of the external display (display 250).

In addition, in the information processing apparatus 10 according to one or more embodiments described above, one foldable display 150 is provided extending from the inner surface of the first chassis 101 to the inner surface of the second chassis 102, but the present invention is not limited thereto. For example, the information processing apparatus 10 may be configured to include a display only on the inner surface of the first chassis 101. In addition, the information processing apparatus 10 may be configured to include a display on each of the inner surface of the first chassis 101 and the inner surface of the second chassis 102. Regardless of the configuration of the information processing apparatus 10, by connecting to the external display device 20, the display layout change processing described with reference to FIGS. 5A to 13 and FIG. 16 can be applied.

In addition, in one or more embodiments described above, an example has been illustrated in which the plurality of displays whose display is controlled by the information processing apparatus 10 are two displays, the embedded display of the information processing apparatus 10 and the external display of the external display device 20, but the present invention is not limited thereto. When the information processing apparatus 10 is equipped with a plurality of embedded displays, the plurality of displays whose display is controlled may be the plurality of embedded displays. Further, when the information processing apparatus 10 is connected to a plurality of external display devices 20, the plurality of displays whose display is controlled may be the plurality of external displays, or the plurality of external displays and one or more embedded displays. That is, the plurality of displays whose display is controlled by the information processing apparatus 10 may be two displays, three or more displays, and may be either an embedded display or an external display.

In addition, in one or more embodiments described above, there are three types of layouts that can be selected from the layout selection icon L1 or L2 (see FIGS. 5A-5B): a layout in which the entire screen area of the display 150 is one display area, a layout in which the screen area is divided into two, upper and lower, and a layout in which the screen area is divided into three, but the present invention is not limited thereto. For example, it may be possible to select only a part of the above three types of layouts, or it may be possible to select a layout in which the screen area is divided into four or more display areas.

Further, in one or more embodiments described above, an example of touch operation on a plurality of touch panel displays that are configured by integrating an input unit (touch sensor) and a display unit is described, but the present invention is not limited to the touch panel display.

The information processing apparatus 10 described above has a computer system inside. The process in each configuration of the information processing apparatus 10 described above may be performed by recording a program for realizing the function of each configuration of the information processing apparatus 10 described above on a computer-readable recording medium, and reading the program recorded on the recording medium with the computer system to execute the program. Here, "reading the program recorded on the recording medium into the computer system to execute the program" includes installing the program in the computer system. The "computer system" herein includes the OS or hardware such as peripheral devices. In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built in the computer system. As described above, the recording medium that stores the program may be a non-transitory recording medium such as a CD-ROM.

In addition, the recording medium also includes an internal or external recording medium that can be accessed from a distribution server to distribute the program. A configuration may be used in which the program is divided into a plurality of programs, downloaded at different timings, and then combined with each configuration of the information processing apparatus 10, or distribution servers for distributing the respective divided programs may be different. Further, the "computer-readable recording medium" includes a medium, which holds the program for a certain period of time, such as a volatile memory (RAM) inside the computer system that serves as a server or a client in a case in which the program is transmitted via the network. The above-described program may be a program for realizing a part of the above-described functions. Further, the program may be a so-called difference file (difference program) in which the above-described functions can be realized in combination with the program already recorded in the computer system.

A part or all of the functions of the information processing apparatus 10 in the above-described embodiments may be realized by an integrated circuit such as a large scale integration (LSI). Each of the functions may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technique lead to appearance of an integrated circuit technique that replaces the LSI, an integrated circuit based on the technique may be used.

DESCRIPTION OF SYMBOLS

10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
19 external connection terminal
181 display selection icon display processing unit
182 display selection processing unit
183 display selection information display processing unit
184 layout selection icon display processing unit
185 layout selection processing unit
186 layout selection information display processing unit
187 display layout change unit

What is claimed is:

1. An information processing apparatus that controls display on a plurality of displays, the apparatus comprising:
- a memory configured to store a program of an application; and
- a processor configured to control displaying a window of the application on at least one of the plurality of displays by executing the program of the application stored in the memory, wherein
- the processor is configured to perform:
  - when a drag operation is accepted for the window displayed on at least one of the plurality of displays, a first display process of displaying first icons corresponding to the plurality of displays on a display on which the drag operation is started,
  - a first selection process of selecting a display corresponding to an icon selected by hovering an operation position over any of the first icons corresponding to the plurality of displays as a display for displaying the window being dragged,
  - a second display process of displaying a second icon from which a display area is selectable, in which the window is to be displayed within a screen area of the display selected by the first selection process, a second selection process of selecting a display area selected by the drag operation on the second icon as a display area for displaying the window being dragged, when the drag operation is completed on the window with the operation position of the drag operation hovered over any of the first icons and no display area selected by the second selection process, a third display process of displaying the window at a predetermined position in the screen area of the display selected by the first selection process, and when the drag operation is completed on the window with any display area selected by the second selection process, a fourth display process of displaying the window in the display area selected by the second selection process within the screen area of the display selected by the first selection process.

2. The information processing apparatus according to claim 1, wherein display area options selectable by the drag operation on the second icon include an option in which a display area is selectable, which is obtained by splitting the screen area of the display selected by the first selection process into a plurality of areas, and an option in which the entire screen area is selectable as a display area.

3. The information processing apparatus according to claim 1, wherein the processor is configured to, in the third display process, display the window at a center position of the screen area of the display selected by the first selection process.

4. The information processing apparatus according to claim 1, wherein the processor is configured to, in the third display process, display the window at a predetermined size smaller than a maximum size at the predetermined position in the screen area of the display selected by the first selection process.

5. The information processing apparatus according to claim 1, wherein the processor is configured to, in the third display process, maximize and display the window in the screen area of the display selected by the first selection process.

6. The information processing apparatus according to claim 1, wherein the processor is configured to, in the third display process, display the window at the predetermined position in the screen area of the display selected by the first selection process, without changing a size of the window when the drag operation is performed.

7. The information processing apparatus according to claim 6, wherein the processor is configured to, when the size of the window when the drag operation is performed is larger than a maximum size, in the third display process, change the size of the window to be displayed in the screen area of the display selected by the first selection process and display the window at the maximum size or a predetermined size smaller than the maximum size.

8. A control method in an information processing apparatus including a memory configured to store a program of an application, and a processor configured to control displaying a window of the application on at least one of a plurality of displays by executing the program of the application stored in the memory, the method comprising:

via the processor, when a drag operation is accepted for the window displayed on at least one of the plurality of displays, a first display step of displaying first icons corresponding to the plurality of displays on a display on which the drag operation is started;

a first selection step of selecting a display corresponding to an icon selected by hovering an operation position of the drag operation over any of the first icons corresponding to the plurality of displays as a display for displaying the window being dragged;

a second display step of displaying a second icon from which a display area is selectable, in which the window is to be displayed within a screen area of the display selected in the first selection step;

a second selection step of selecting a display area selected by the drag operation on the second icon as a display area for displaying the window being dragged;

when the drag operation is completed on the window with the operation position of the drag operation hovered over any of the first icons and no display area selected in the second selection step, a third display step of displaying the window at a predetermined position in the screen area of the display selected in the first selection step; and when the drag operation is completed on the window with any display area selected in the second selection step, a fourth display step of displaying the window in the display area selected in the second selection step within the screen area of the display selected in the first selection step.

* * * * *